US012744020B1

(12) United States Patent
Glaser, II

(10) Patent No.: US 12,744,020 B1
(45) Date of Patent: Sep. 22, 2026

(54) ACOUSTIC STRINGED MUSICAL INSTRUMENT PITCH CHANGER SYSTEM AND RELATED METHODS

(71) Applicant: Joseph Glaser, II, Nashville, TN (US)

(72) Inventor: Joseph Glaser, II, Nashville, TN (US)

( * ) Notice: Subject to any disclaimer, the term of this patent is extended or adjusted under 35 U.S.C. 154(b) by 306 days.

(21) Appl. No.: 18/633,996

(22) Filed: Apr. 12, 2024

Related U.S. Application Data

(60) Provisional application No. 63/458,924, filed on Apr. 12, 2023.

(51) Int. Cl.
*G10D 3/147* (2020.01)
*G10D 1/08* (2006.01)

(52) U.S. Cl.
CPC ............... *G10D 3/147* (2020.02); *G10D 1/08* (2013.01)

(58) Field of Classification Search
CPC ........... G10D 3/147; G10D 1/08; G10D 3/00; G10D 1/00
See application file for complete search history.

(56) References Cited

U.S. PATENT DOCUMENTS

2022/0223124 A1* 7/2022 Dlugasz .................. G10D 1/08

* cited by examiner

*Primary Examiner* — Kimberly R Lockett
(74) *Attorney, Agent, or Firm* — Jonathan D. Spangler; Jay B. Bell

(57) ABSTRACT

A pitch changer system for an acoustic string musical instrument, including a lever assembly, a dual-string attenuation assembly, and a lever tensioning assembly. Applying force to move the lever in a first direction forces a bell crank of the lever assembly into rotation such that a coupling system of the lever tensioning assembly causes a swing plate of the dual-string attenuation assembly to force a string bending post of the dual-string attenuation assembly into rotation to elongate and thereby temporarily change the pitch of a string coupled to the string bending post.

20 Claims, 19 Drawing Sheets

ACOUSTIC STRINGED MUSICAL INSTRUMENT PITCH CHANGER SYSTEM AND RELATED METHODS

CROSS-REFERENCES TO RELATED APPLICATIONS

The present application is a nonprovisional application claiming the benefit of priority under 35 U.S.C. § 119(e) from U.S. Provisional Application No. 63/458,924, filed on Apr. 12, 2023, the complete disclosure of which is hereby incorporated by reference into this disclosure as if set forth fully herein.

FIELD

The present disclosure relates generally to stringed musical instruments and, more particularly, to a pitch changer system for use with an acoustic stringed musical instrument with various improvements over the prior art.

BACKGROUND

On a stringed instrument, it is often an object of the player to change the pitch of a played note while it is vibrating. This may be done by moving a finger, metal bar or other object along the string on the fingerboard to shorten or lengthen the vibrating string length to change its pitch or by bending the string across the fingerboard to increase the tension and thus raise the pitch of the string. A vibrating string's pitch can also be raised or lowered with a mechanical device to which one end of the string is attached. This mechanism may be linked to a lever or foot pedal that can be operated by a finger, palm, foot, knee, elbow, wrist etc. Such a lever can also be the attachment point for the instrument strap, which typically crosses the player's shoulder and suspends the instrument. This strap-attached and activated pitch bending device is often used on, but not limited to, guitars and guitar family instruments.

Conventionally, a guitar strap activated pitch bending device employs a player's downward pressure with the hand that is on the neck or body to move a lever at one or both connection points of the main strap or of an auxiliary strap. These devices have been in use since 1920 and common styles and multiple preferences have developed around the use of pitch bending devices. In particular, there is not a singular preference of which string or strings within a tuning are desired to be pitch bent, but typically on a guitar tuned to the standard tuning, the second and third highest pitched strings ("B" and/or "G" strings) are the focus of prior art string-bending efforts. (See U.S. Pat. No. 4,354,417 to Glaser and U.S. Pat. No. 9,412,346 to Glaser et al.) The typical strap activated string bending mechanism consists of a strap attachment lever connected to a bell crank which is further connected by linkage to a lever or pivot in or near the bridge saddle to which one end of the string is attached. Further, there is often a spring connected to that linkage to resist the player's pitch-bending effort and also support the partial weight of the instrument as exerted at the strap end. Most commonly, a single string activating mechanism is employed without the ability for the player to easily choose between the "B" or "G" strings without prior commitment to one configuration or the other or further modification to the instrument.

Although representing certain advancements at the time, the prior art pitch changer systems for stringed instruments suffer a variety of drawbacks. The present disclosure is directed at overcoming these drawbacks through a host of improvements. For example, prior art pitch changer systems are not easily swappable between strings (e.g. between "B" and "G" strings or vice versa). Moreover, many prior art pitch changer systems have been used on electric guitars with so-called "bolt-on necks" (necks bolted to neck plate mounted on body), wherein the prior art strap-activated pitch changer systems are installed through the neck plate which can weaken the instrument's neck-to-body mounting. Other prior art string bending systems require considerable modification to the instrument (See U.S. Pat. No. 5,481,954 to Parsons), or present complications in neck removal for repair and/or replacement, are bulky, and/or unstable and thus subject to becoming loose and becoming inaccurate/off-pitch during use. For example, due to the necessity to having a strap attachment lever that activates the mechanism by being securely connected to an interior bell crank through the neck plate, attaching that lever to that bell crank has typically been done with exterior screws or bolts and these have been subject to constant loosening during use.

The prior art pitch changer systems are also largely limited to electric stringed musical instruments (e.g. electric guitars), with no suitable pitch changer system designed specifically for acoustic stringed musical instruments, such as (but not limited to) the Fender Acoustasonic guitar.

The present disclosure is directed at overcoming, or at least reducing, the problems of the prior art pitch changing systems.

SUMMARY

The present disclosure overcomes the disadvantages of the prior art in a variety of manners, by providing a pitch changer system for an acoustic string musical instrument having a body and a neck. The pitch changer system includes a lever assembly, a dual-string attenuation assembly and a lever tensioning system. The lever assembly includes a mounting plate configured to be mounted to the body of the stringed musical instrument, a lever having a first section extending through the mounting plate in mating engagement with a first section of a bell crank and a second section configured to be moved directly or indirectly by a user to effectuate a pitch change of a string on the stringed musical instrument, a pair of bearing assemblies dimensioned to receive and enable rotational movement of the first sections of the lever and bell crank while in mating engagement, and a rotation adjustment assembly to selectively adjust a rotational range of the second section of the lever and a second section of the bell crank.

The dual-string attenuation assembly includes a housing, a swing plate, a string bending post, a string pin receiver, and a top. The housing is configured to be positioned within a recess formed in a traditional bridge mounted to the surface (soundboard) of the acoustic stringed musical instrument. The housing includes a first vertical slot dimensioned to receive a string bending post or a string pin receiver (depending upon the string selected for attenuation), a second vertical slot dimensioned to receive the other of a string bending post or a string pin receiver (depending upon the string selected for attenuation), and a pair of arms located at a lower section of the housing dimensioned to rotatably couple the swing plate to the housing such that the swing plate extends into the acoustic chamber of the acoustic stringed musical instrument for cooperation with the string tensioning system. The string pin bending post and the string pin receiver are each dimensioned to receive a traditional string pin for anchoring the associated string to the bridge, given that the dual-string attenuation assembly is mounted within the bridge. In so doing, the acoustic stringed instrument pitch changer of the present disclosure preserves the traditional ornamental appearance of the bridge assembly.

The swing plate is configured to interact with a string bending post positioned within one of the vertical slots in the housing of the dual-string attenuation assembly, along with the string tensioning system, which in turn is coupled to the lever assembly. The swing plate includes a centrally disposed aperture on either side of a first contact region and a second contact region. The first contact region is configured to contact the string bending post of the dual-string attenuation assembly when the string bending post is positioned through the first vertical slot in the housing of the dual-string attenuation assembly. The second contact region configured to contact the string bending post of the dual-string attenuation assembly when the string bending post is positioned through the second vertical slot in the housing of the dual-string attenuation assembly.

The lever tensioning system is configured to be mounted to the body of the acoustic stringed musical instrument. The lever tensioning system includes a spring, a spring tension adjuster, and a coupling system configured to couple the spring to the swing plate and the second section of the bell crank. In use, applying force to move the second section of the lever in a first direction forces the bell crank into rotation such that the coupling system causes the swing plate to force the string bending post of the dual-string attenuation assembly into rotation to elongate and thereby temporarily change the pitch of a string coupled to the string bending post. Depending upon whether the string bending post is positioned within the first or second vertical slot of the housing, the dual-string attenuation assembly may be used on a first or a second string, such as (by way of example only) the G-string or B-string on an acoustic guitar.

The acoustic stringed instrument pitch changer system disclosed herein improves the stability and long-term security of the strap attachment and activation arm through the neck plate by assembling the lever and bell crank as corresponding half shafts securely combined by two circular bearings or bushings that are mounted in the neck plate assembly, which also serves to optimize the smooth rotation of the lever arm and bell crank assembly. The pitch changer system disclosed herein provides flexibility of choice due to the "dual vertical slot" construction of the dual-string attenuation assembly, wherein a string bending post can be positioned in one vertical slot and a traditional string pin receiver can be positioned in the other vertical slot, as well as reversed if the adjacent string is selected by the user as the desired string for attenuation. To accomplish this, the string tension is temporarily lowered such that the string bending post and string pin receiver may be reversed within the vertical slots to allow the activation of the "G" string instead of the "B" string or vice versa. The acoustic stringed instrument pitch changer disclosed herein is also suited, as the name suggests, for acoustic stringed instruments, such as (but not limited to) the Acoustasonic line of guitars from Fender Musical Instruments Corporation of Corona, California.

The acoustic stringed instrument pitch changer system of the present disclosure also significantly reduces the invasive nature of the mechanism on the guitar by combining the mechanism into the structure of the neck plate itself so that the force exerted by the player on the pull lever (and the internal mechanism) is supported by the entirety of the neck plate and its mounting screws. Further, the disclosed acoustic stringed instrument pitch changer system securely mounts the mechanism housing to the neck plate, which allows the lever and mechanism to have improved structural integrity over prior art systems. Additionally, the acoustic stringed instrument pitch changer system disclosed herein includes an entirely self-contained neck plate mechanism, which greatly simplifies and reduces the time required for installation and any service. The disclosed acoustic stringed instrument pitch changer system also boasts a mechanism consisting of a lever axle of two half shafts held together by two bearings, which allows the assembly of the exterior strap activated pull lever arm and the interior bell crank to be installed through and on both sides on the neck plate with a minimum opening in the neck plate. This significantly reduces the chance that dirt or other contaminants can enter the mechanism and increases the structural integrity of the neck mounting plate.

The acoustic stringed instrument pitch changer system disclosed herein may include a variety of additional features and/or design modifications. For example, in addition to pitch changing via strap-enabled lever actuation (to string bend when the player pushes the guitar down or away from his/her body), it is also contemplated that a cable or other element may be employed to allow the player to note-bend by pulling up on the guitar (vs. pushing down on the guitar as described above). The pitch-changing may be tunable or adjustable via the use of a stop that limits the travel of the lever arm to achieve a predetermined, preferred pitch change. Such a tuner is commonly an adjustable stop that limits the travel of the bell crank (coupled to the lever arm via rod and/or cable to another lever) and the string anchoring finger (mounted within the instrument bridge to which the instrument string is also anchored). The rotation of this string anchoring finger stretches and/or releases said string by an adjustable increment which causes the desired pitch bend. Commonly, a spring or other resistive means is also connected to the bottom of the string finger and may extend further through the instrument body to an accessible screw seated in a bushing, ferrule or on a plate where the resistive tension can be adjusted.

The lever of the disclosed pitch changer is securely and rigidly connected to the axis on which it rotates. It securely shares this axis with the bell crank, which advantageously pulls the linkage connecting to the bridge saddle to affect the string length and note pitch. The pitch changer of the present disclosure, accomplishes this by constructing the strap lever arm and the bell crank each as unitary pieces machined with, welded to or otherwise permanently connected to opposite halves of the axis shaft that extends through the mounting plate. In use, these two halves of the axis shaft are assembled and held rigidly as one axis shaft by an upper and lower bearing or low friction bushing. These bearings/or bushings are firmly seated in a bearing block chassis that is constructed as a unitary fabrication of the mounting plate or, alternatively, this chassis is screwed, soldered, glued or welded to said neck plate. This bearing block and cover plate can also contain the adjustable tuner stop against which the bell crank will stop its rotation and that of the strap lever. Because the two axis shaft halves are banded together by bearings or bushings, and the bearings or bushings are firmly seated in the chassis, the strap lever and bell crank can be assembled through a cover plate with an opening minimally larger than the axis shaft. Further, because the strap lever arm and bell crank are held together by one or more bearings or bushings and said bearings or bushing are rigidly retained in the bearing block, this assembly will then act as one unitary piece and will not be subject to loosening when subject to the stresses of constant use, impact or vibration.

Further, the main lever arm is connected to the axis and bell crank without the use of any screw or bolt subject to coming loose or having its threads or head stripping through repeated tightening. This assembly of strap lever, axis shaft, bell crank, bearings, chassis, tuner stop and cover plate is thus an integrated unit that can be dropped whole into a cavity in the instrument body for installation simplicity, economic advantage and durability.

The acoustic stringed instrument pitch changer system disclosed herein enables the ability to quickly and easily switch between strings for pitch bending. For example, musicians who employ this mechanism and its mechanically enabled pitch bending style commonly select the "B" string or "G" string or both for pitch bending. Typically, musicians use one string or the other and less frequently both. Heretofore, it has been complicated or impossible for the player to select which string to apply strap activated string bending. With the acoustic stringed instrument pitch changer of the present disclosure, a player may simply and quickly loosen the strings and reverse the location of the string pin receiver and string bending post (from the first vertical slot to the second vertical slot of the housing or vice versa) and thus convert a "B" mechanism into a "G" mechanism or vice versa. The string length tuning compensation or intonation offset is also designed to similarly reverse itself to accommodate the difference of string length between a "E" and "B" string saddle and a "G" and "D" string saddle as adjusted for typical acoustic guitar string sets.

The dual-string attenuation assembly of the acoustic stringed instrument pitch changing system is dimensioned to be positioned within a recess formed through a traditional bridge located on the soundboard of an acoustic stringed instrument, as well as the underlying section of the soundboard itself. The string bending post and the string pin receiver thusly extend into the acoustic chamber of the acoustic stringed instrument, such that the string bending post interacts with the swing plate, which rotates from the lower section of the housing of the dual-string attenuation assembly. This swing plate allows quick and simple alternating of position of the selected string mechanism and, in addition, may be articulated to permit the "G" string bending post (if selected) to contact the swing plate with an offset comparable to the longer string length intonation offset of a typical "G" string saddle. Same for the B-string.

The acoustic stringed instrument pitch changer disclosed herein also boasts a number of features and advantages. The lever assembly has a unitary pre-assembled drop-in design to quickly and easily be installed on the neck of the guitar by substituting it for the factory neck plate. The lever assembly includes a bearing housing extending from the lower surface of the mounting plate which houses a pair of bearing assemblies (upper and lower) which hold together the two halves of the split crank shaft (half-shaft of lever mating with half-shaft of the bell crank) to allow the lever arm and the bell crank to be assembled through an essentially shaft sized hole in the mounting plate while acting as one strong unitary piece not subject to loosening. The bell crank includes an arm extending from the half-shaft, which includes multiple attachment points for coupling with a cable forming part of the lever tensioning system (e.g. spring, spring tension adjuster, and cable) to provide multiple rotational ranges of the lever (e.g. three attachment points for low, medium, and large rotational ranges of the lever). The tuner thumbscrew and bell crank stop are self-contained.

By virtue of the dual-string attenuation assembly, which mounts within a traditional acoustic bridge and uses traditional string pins to anchor the respective strings, the overall bridge of an acoustic stringed instrument with the acoustic string instrument pitch changer system of the present disclosure preserves the traditional ornamental appearance of the bridge assembly. The dual-string attenuation assembly includes a static saddle section and a rotating saddle section. The static saddle section covers the E, A, D and E strings, as well as the string associated with the string pin receiver of the dual-string attenuation assembly, namely the G or B string, by way of example only. The rotating saddle covers the string associated with the string bending post, either the G or B, by way of example only. The rotating saddle may be reversed and placed in the other of the two vertical slots of the housing of the dual-string attenuation assembly.

While the preferred option may be to use one static saddle section (string pin receiver) and the rotating saddle section (string bending post) for single-string attenuation, it is contemplated that the dual-string attenuation assembly may be used with two static saddle sections (two string pin receivers) or two rotating saddle sections (string bending posts). If used with two static saddle sections (two string pin receivers), then traditional string pins may be used to secure the strings to the bridge and the guitar can be used as a traditional, non-attenuating instrument. If used with two rotating saddle sections (string bending posts), then traditional string pins may be used to secure the strings to the bridge and the guitar can be used as a dual-string attenuating instrument.

The acoustic stringed instrument pitch changing system described herein boasts a host of innovative features, which collectively overcome the drawbacks of the prior art and solve the associated unmet needs within the stringed instrument industry.

As additional description to the embodiments described below, the present disclosure describes the following embodiments.

Embodiment 1 is a pitch changer system for a stringed musical instrument having a body, a neck, and a saddle assembly attached to the body, the pitch changer system comprising: a lever assembly configured to be mounted to said body of said stringed musical instrument, said lever assembly including a lever rotatably coupled to a mounting plate; a dual-string attenuation assembly configured to be mounted to said saddle assembly, said dual-string attenuation assembly including: a housing coupled to said saddle assembly and including a first vertical slot and a second vertical slot extending through said housing; a rotating string bending post positioned within said first vertical slot and hingedly coupled to said housing, said rotating string bending post including a string aperture configured to receive a first string of said instrument and a string pin to secure said first string to said rotating string bending post during use; and a static string pin receiver positioned within said second vertical slot, said static string pin receiver including a string aperture configured to receive a second string of said instrument and a string pin to secure said second string to said static string pin receiver during use; and a lever tensioning system configured to be mounted to said body of said stringed musical instrument, wherein applying force to move said lever in a first direction forces said rotating string bending post into rotation to elongate and thereby temporarily change the pitch of said first string.

Embodiment 2 is the pitch changer system of embodiment 1, wherein said rotating string bending post and said static string pin receiver may be selectively reversed relative to said first and second vertical slots of said housing such that said second string of said instrument is associated with said rotating bending post and said first string of said instrument is associated with said static pin receiver.

Embodiment 3 is the pitch changer system of embodiments 1 or 2, further comprising a swing plate hingedly coupled with said housing and configured to extend into an acoustic chamber formed in the body of the stringed musical instrument, said swing plate including a recess configured to receive a portion of the lever tensioning system therein.

Embodiment 4 is the pitch changer system of any of embodiments 1 through 3, wherein the swing plate is configured to transfer the force applied to the lever through the lever tensioning system to the rotating string bending post to cause the rotating string bending post to rotate within the first vertical slot of the housing.

Embodiment 5 is the pitch changer system of any of embodiments 1 through 4, wherein the rotating string bending post further comprises a bumper element coupled to a distal end of the rotating string bending post and configured to interface with the swing plate.

Embodiment 6 is the pitch changer system of any of embodiments 1 through 5, wherein the swing plate includes a first contact region on a first side of the recess, and a second contact region on the second side of the recess.

Embodiment 7 is the pitch changer system of any of embodiments 1 through 6, wherein the first contact region is aligned with the first vertical slot of the housing, and the second contact region is aligned with the second vertical slot of the housing.

Embodiment 8 is the pitch changer system of any of embodiments 1 through 7, wherein the rotating string bending post includes a proximal flange extending beyond a top surface of the housing, the proximal flange having a curved string engaging surface configured to interface with the first string of the stringed musical instrument.

Embodiment 9 is the pitch changer system of any of embodiments 1 through 8, wherein the housing includes a top surface and a bottom surface, and the top surface has a curvature corresponding to a curvature of the saddle assembly to seamlessly integrate the housing into the saddle assembly.

Embodiment 10 is the pitch changer system of any of embodiments 1 through 9, wherein the static string pin receiver comprises a top surface and a bottom surface, and the top surface has a curvature corresponding to a curvature of the saddle assembly to seamlessly integrate into the housing and the saddle assembly.

Embodiment 11 is the pitch changer system of any of embodiments 1 through 10, wherein the static string pin receiver further comprises a proximal flange including a lateral extension of the top surface, the proximal flange dimensioned to be received within a top recess of the housing, the top recess positioned adjacent the second vertical slot.

Embodiment 12 is the pitch changer system of any of embodiments 1 through 11, wherein the stringed musical instrument is an acoustic guitar.

Embodiment 13 is a method of equipping a stringed musical instrument having a body and a neck with a pitch changer system, comprising the steps of: creating a lever assembly bore in the body of the stringed musical instrument dimensioned to receive a lever assembly; creating a lever tensioning system bore in the body of the stringed musical instrument dimensioned to receive a lever tensioning system; installing said lever assembly within said lever assembly bore, said lever tensioning system within said lever tensioning system bore, and a dual-string attenuation assembly to a saddle assembly; and interconnecting said pitch changer system such that, during use, an application of force to said lever temporarily changes the pitch of a string coupled to the dual-string attenuation assembly.

Embodiment 14 is the method of embodiment 13, wherein said lever assembly comprises a lever rotatably coupled to a mounting plate.

Embodiment 15 is the method of embodiments 13 or 14, wherein said dual-string attenuation assembly comprises: a housing coupled to said saddle assembly and including a first vertical slot and a second vertical slot extending through said housing; a rotating string bending post positioned within said first vertical slot and hingedly coupled to said housing, said rotating string bending post including a string aperture configured to receive a first string of said instrument and a string pin to secure said first string to said rotating string bending post during use; and a static string pin receiver positioned within said second vertical slot, said static string pin receiver including a string aperture configured to receive a second string of said instrument and a string pin to secure said second string to said static string pin receiver during use.

Embodiment 16 is the method of any of embodiments 13 through 15, wherein said dual-string attenuation assembly further comprises a swing plate hingedly coupled with said housing and configured to extend into an acoustic chamber formed in the body of the stringed musical instrument, said swing plate including a recess configured to receive a portion of the lever tensioning system therein.

Embodiment 17 is the method of any of embodiments 13 through 16, wherein the swing plate transfers the force applied to the lever through the lever tensioning system to the rotating string bending post to cause the rotating string bending post to rotate within the first vertical slot of the housing.

Embodiment 18 is the method of any of embodiments 13 through 17, wherein the rotating string bending post further comprises a bumper element coupled to a distal end of the rotating string bending post and configured to interface with the swing plate.

Embodiment 19 is the method of any of embodiments 13 through 18, further comprising selectively reversing the rotating string bending post and said static string pin receiver relative to said first and second vertical slots of said housing such that said second string of said instrument is associated with said rotating bending post and said first string of said instrument is associated with said static pin receiver.

Embodiment 20 is the method of any of embodiments 13 through 19, wherein the stringed musical instrument is an acoustic guitar.

BRIEF DESCRIPTION OF THE DRAWINGS

Many advantages of the present disclosure will be apparent to those skilled in the art with a reading of this specification in conjunction with the attached drawings, wherein like reference numerals are applied to like elements and wherein.

DETAILED DESCRIPTION

Illustrative embodiments are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure. The acoustic stringed instrument pitch changer system disclosed herein boasts a variety of inventive features and components that warrant patent protection, both individually and in combination.

Figure 1:
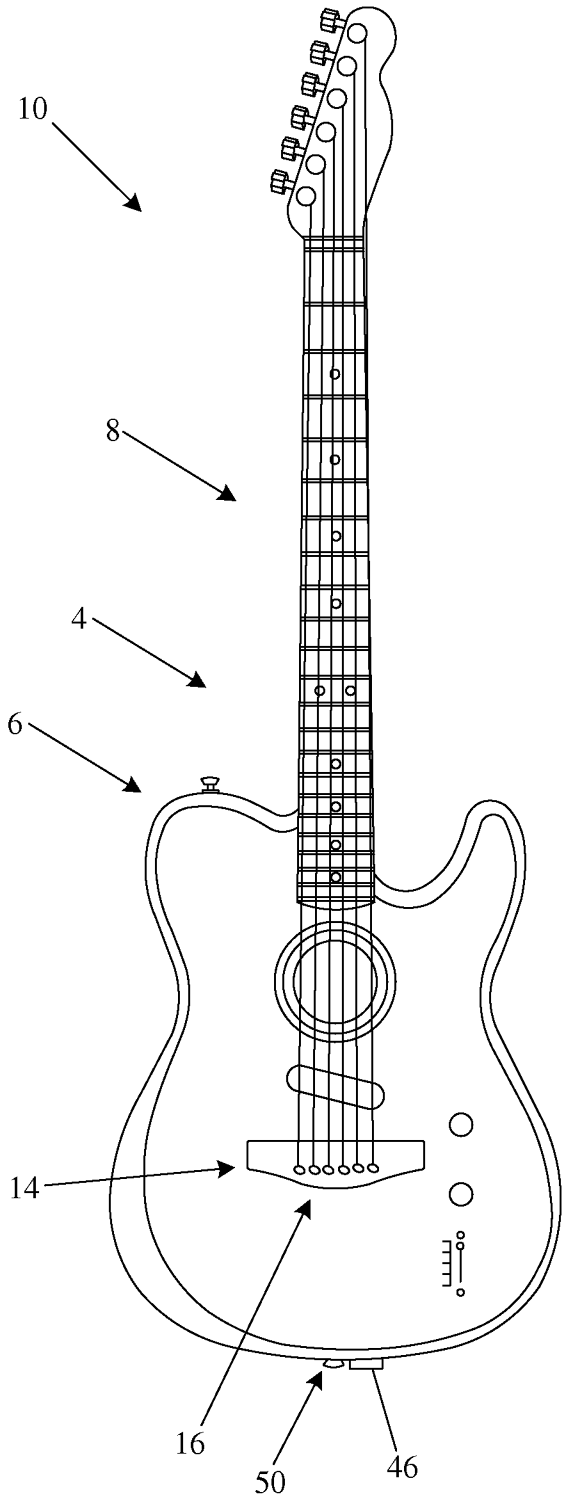
FIGS. 1-2 are front and back views, respectively, of an example of a acoustic guitar equipped with a bridge assembly and a lever assembly of a pitch changer system, according to some embodiments.
Figure 2:
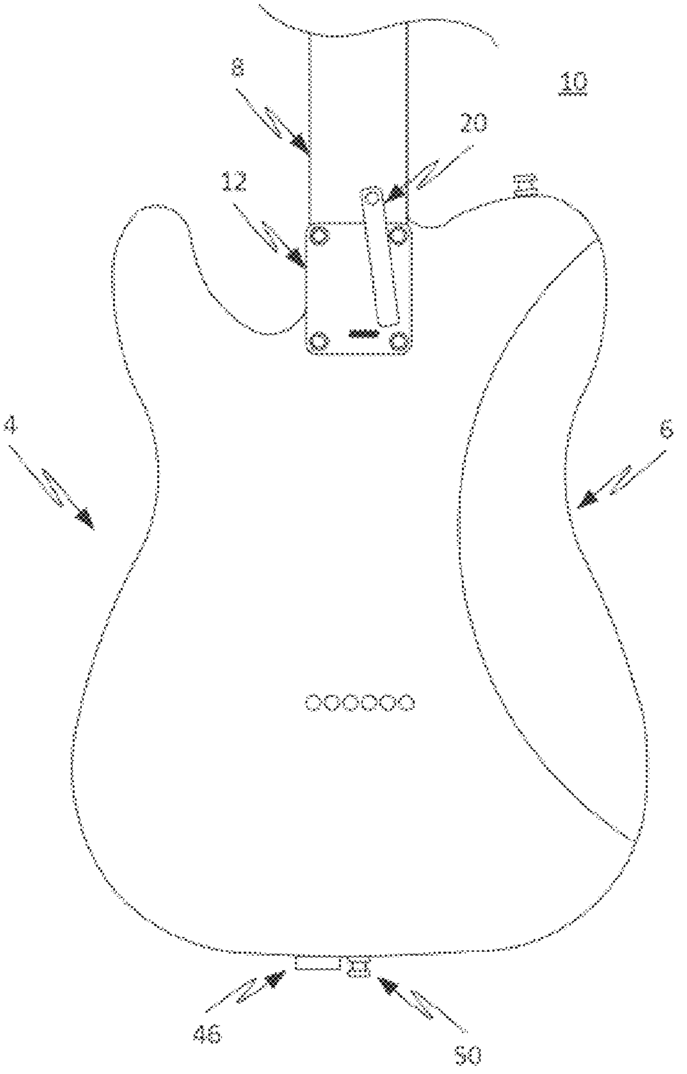

FIGS. 1-5 show an example of a pitch changer system 10 according to some embodiments installed for use on an acoustic stringed instrument 4 including a body 6 and neck 8 as shown in FIGS. 1-2. It will be appreciated that the pitch changer system 10 may be employed with any of a variety of acoustic stringed musical instruments 4 beyond the particular type of acoustic guitar 4 shown (Fender Acoustasonic, by way of example only) without departing from the scope of the present disclosure. In some embodiments, the pitch changer system 10 includes a lever assembly 12 mounted to the back of the body 6 at the junction with the neck 8 (e.g., FIG. 2), a bridge/saddle 14 mounted to the soundboard (top surface) of the body 6 (e.g., FIG. 1), a dual-string attenuation assembly 16 (e.g., FIGS. 3-5) mounted within the bridge/saddle assembly 14, and a lever tensioning system 18 (e.g., FIGS. 6-7) configured to be coupled to the lever assembly 12 in use. By way of example only, each assembly forming the pitch changer system 10 is described in detail below and/or in commonly owned U.S. Pat. No. 11,532,291 to inventor Joseph Glaser, II (the same inventor of the present application) (the '291 Patent), the entire contents of which are incorporated by reference into this disclosure as if set forth fully herein.

In some embodiments, the lever assembly 12 (e.g., FIG. 2) is designed to transfer rotational mechanical force exerted on a lever 20 via a guitar strap (not shown) to an internally disposed bell crank. For details on the construction and operation of the lever assembly 12, please see the associated disclosure in the '291 patent (incorporated by reference). The bridge/saddle assembly 14 (FIGS. 1 and 3-5) includes a base 22 designed to be mounted to the surface (soundboard) of the body 4, as well as a recess 23 configured to receive the dual-string attenuation assembly 16. The dual-string attenuation assembly 16, as will be described in detail below, is configured to anchor first and second strings 2, 3 to the bridge/saddle assembly 14—preferably with a first string 2 being statically coupled and a second string 3 being rotationally coupled, wherein the rotationally coupled string 3 is capable of being selectively stretched to temporarily attenuate the pitch of the string (e.g. by a half step, whole step, etc.).

Figure 8:
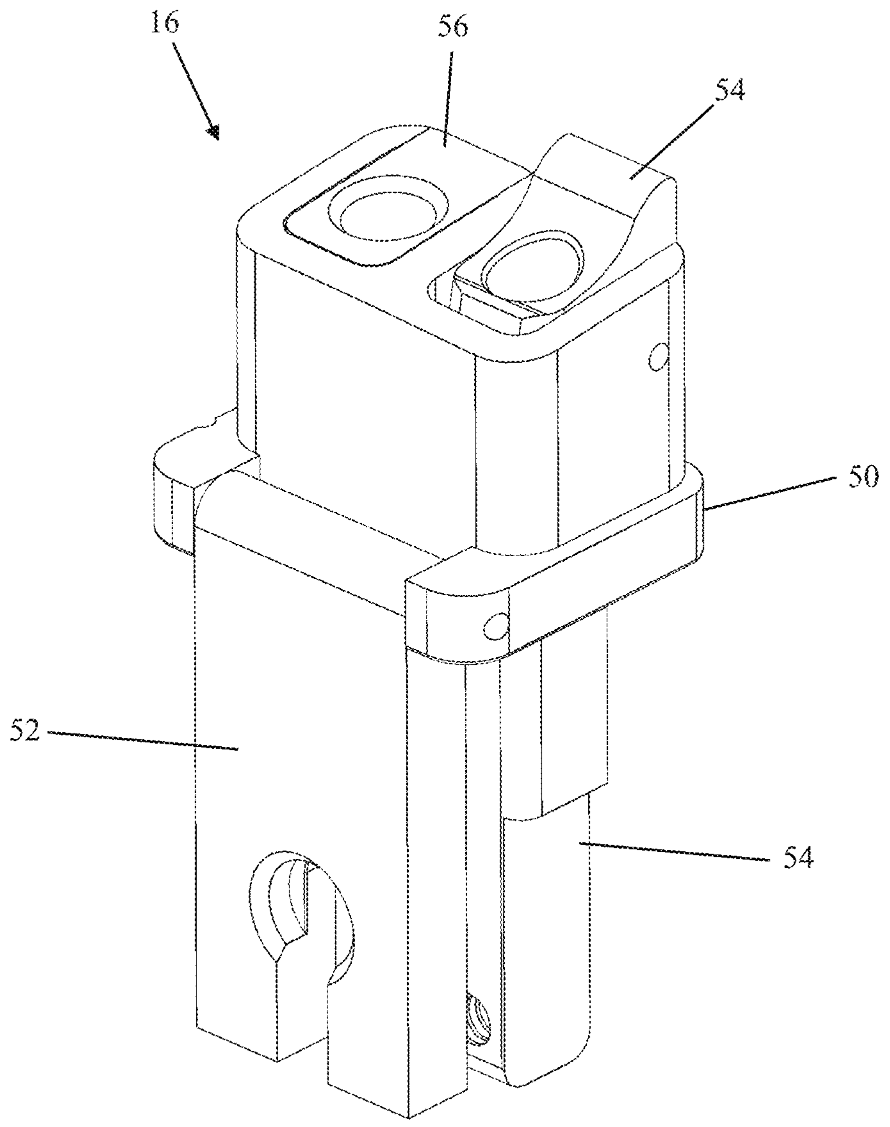
FIGS. 8-10 are top perspective, bottom perspective, and exploded views, respectively, of an example of a dual-string attenuation assembly forming part of the acoustic stringed instrument pitch changer system of FIG. 1, according to some embodiments.
Figure 9:
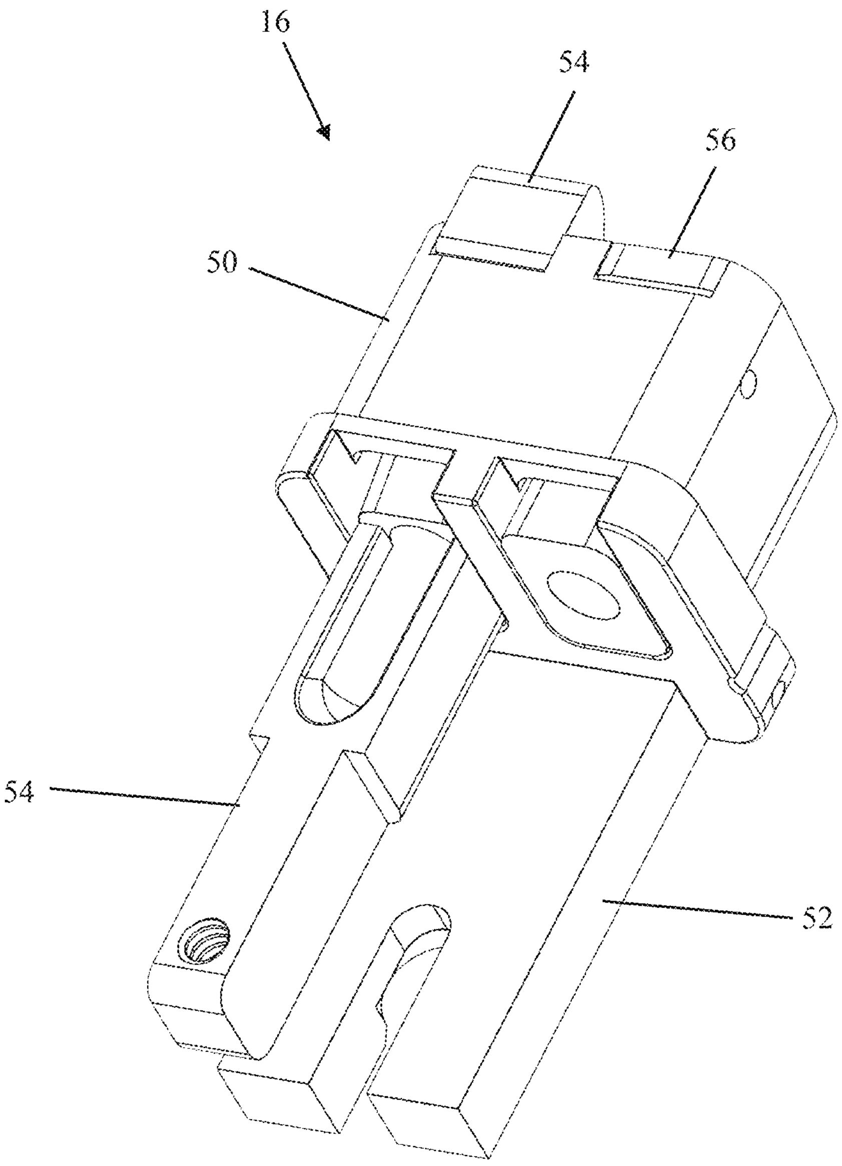
Figure 10:
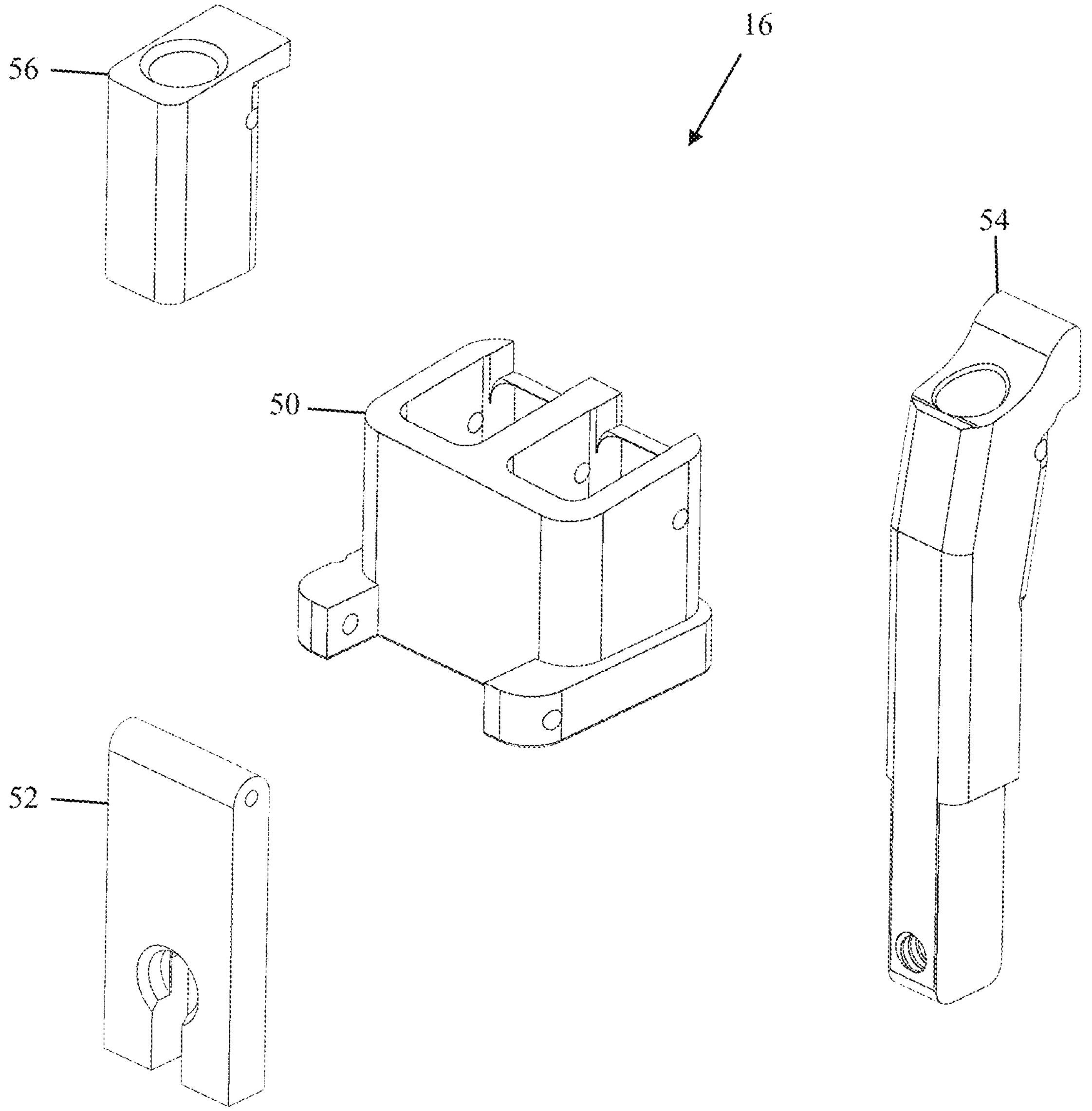
Figure 11:
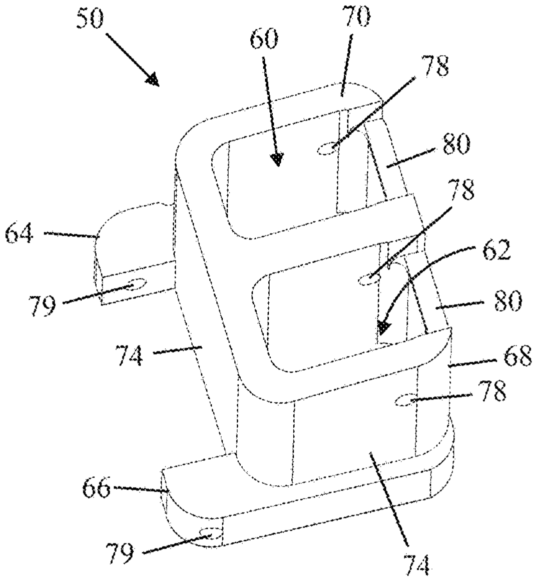
FIGS. 11-14 are various views of an example of a housing forming part of the dual-string attenuation assembly of FIGS. 8-10, according to some embodiments.
Figure 12:
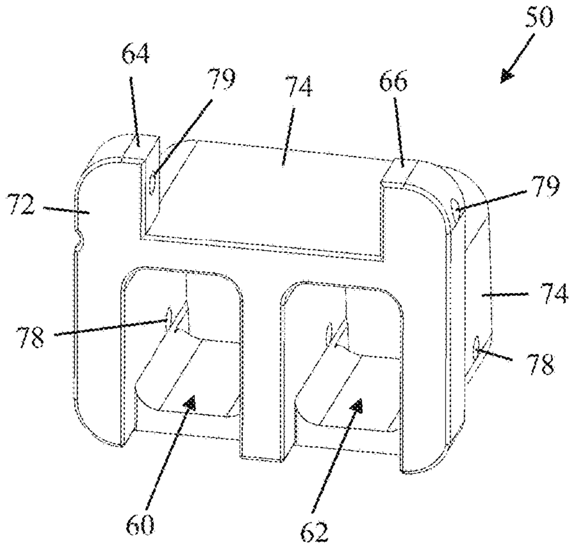
Figure 13:
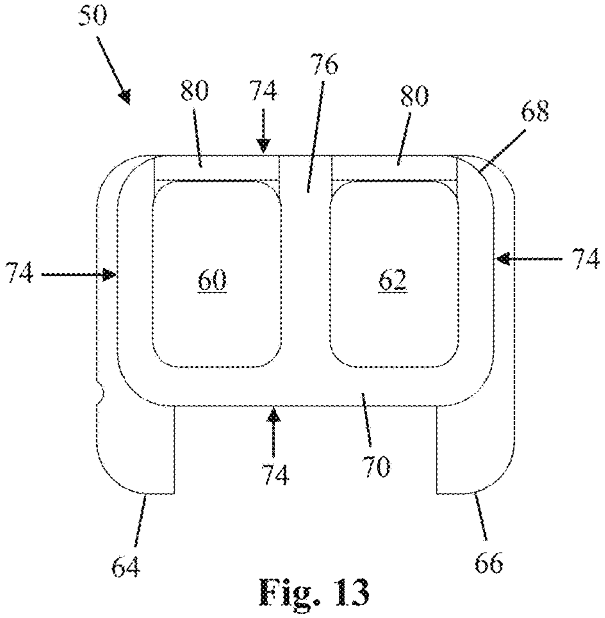
Figure 14:
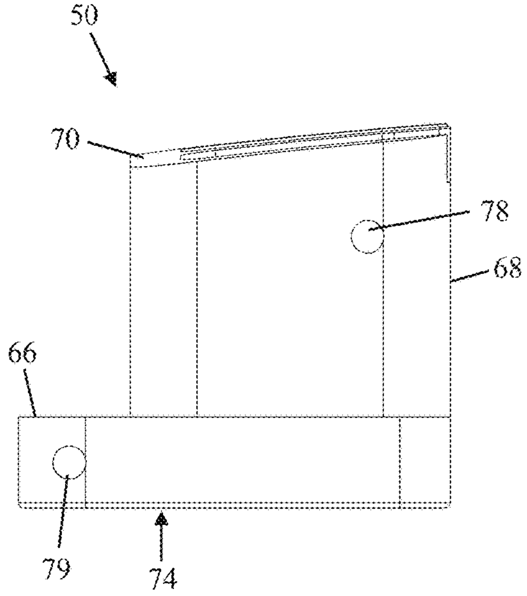
Figure 15:
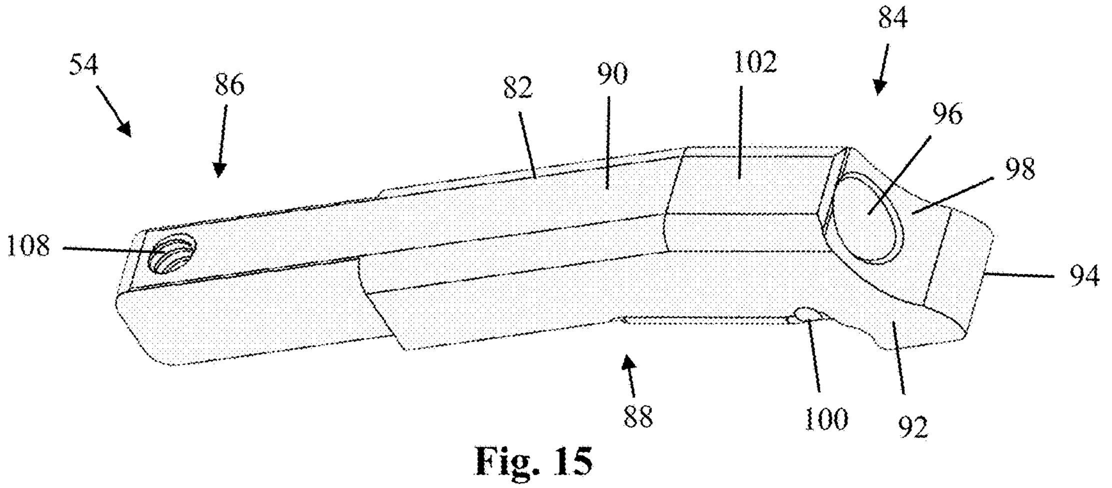
FIGS. 15-20 are various views of an example of a string bending post forming part of the dual-string attenuation assembly of FIGS. 8-10, according to some embodiments.
Figure 16:
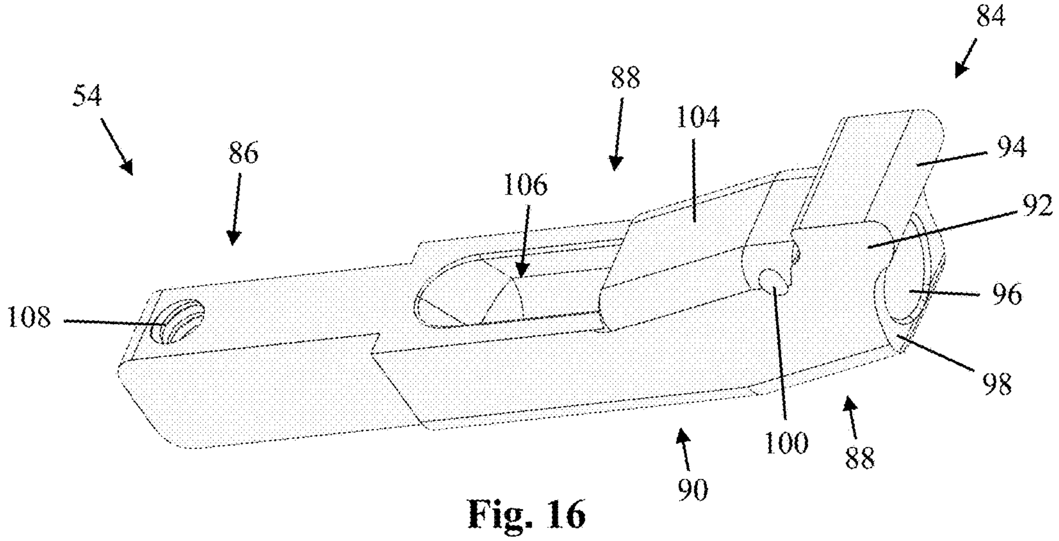
Figure 17:
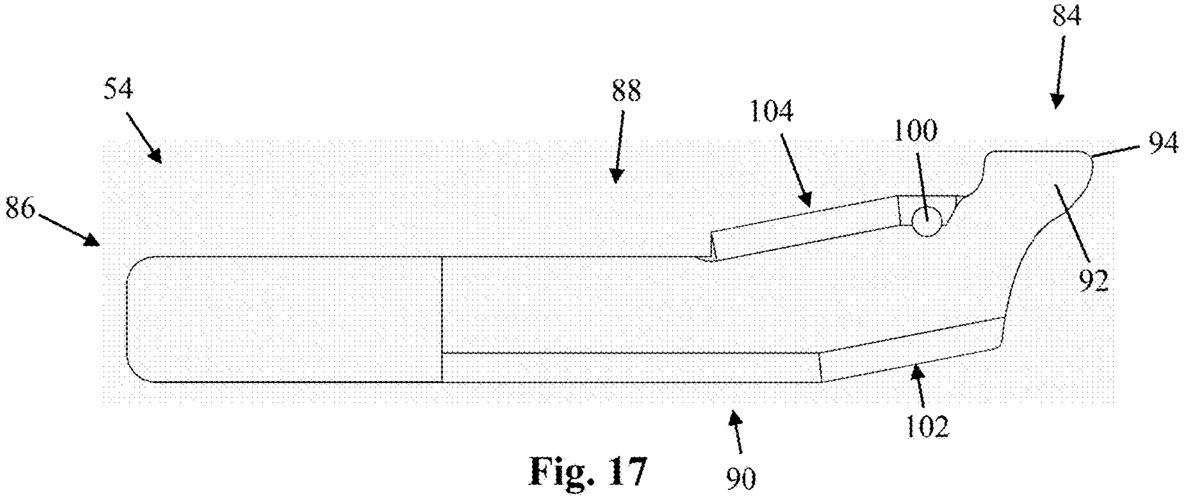
Figure 18:
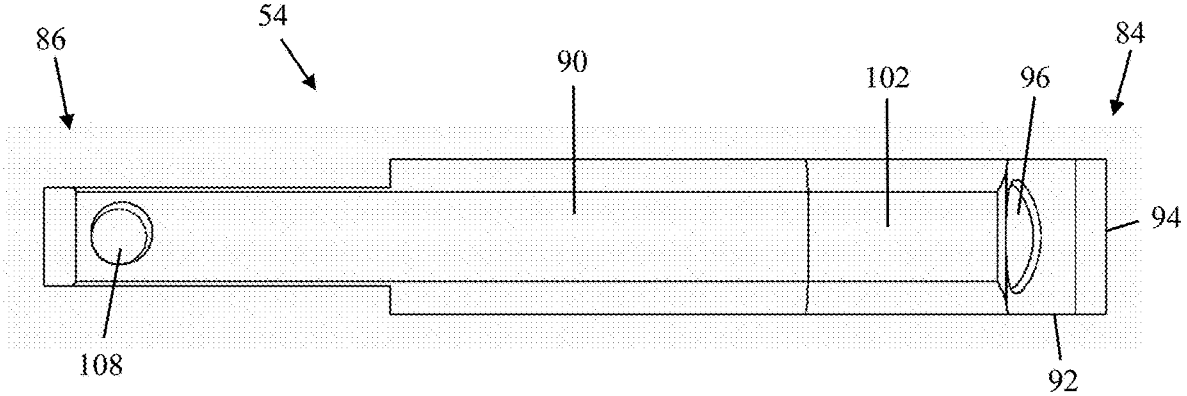
Figure 19:
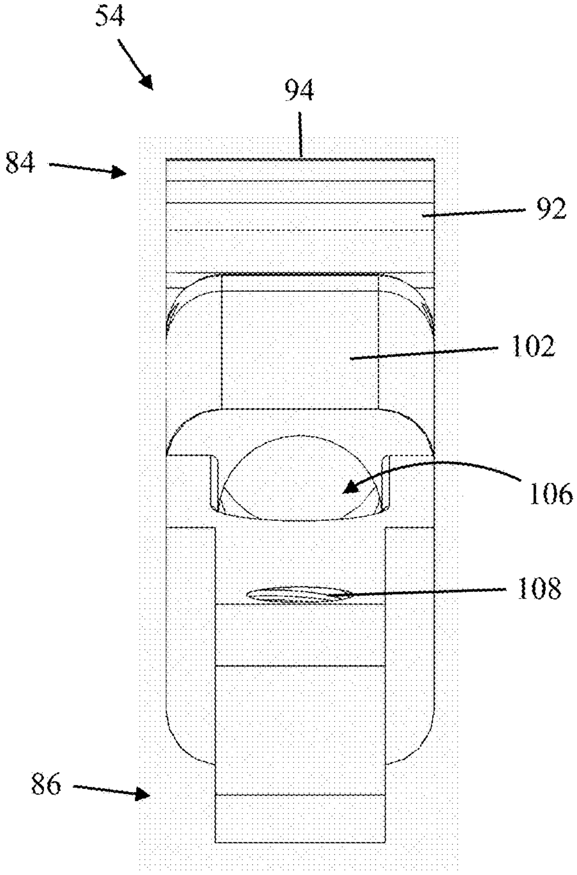
Figure 20:
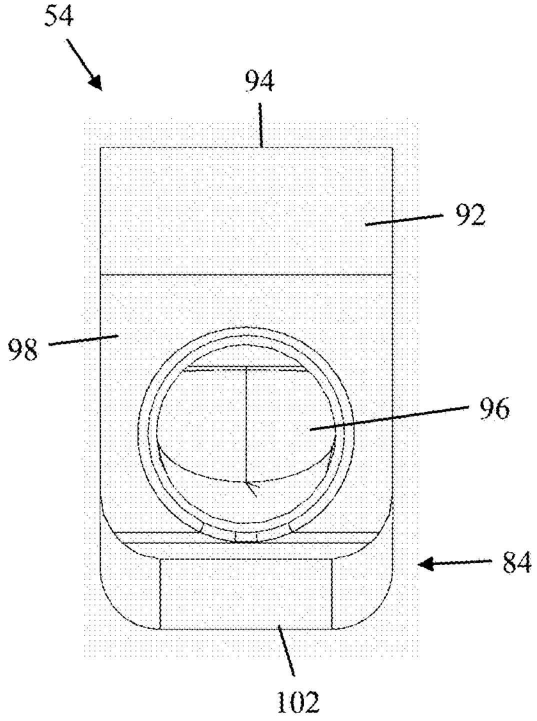
Figure 21:
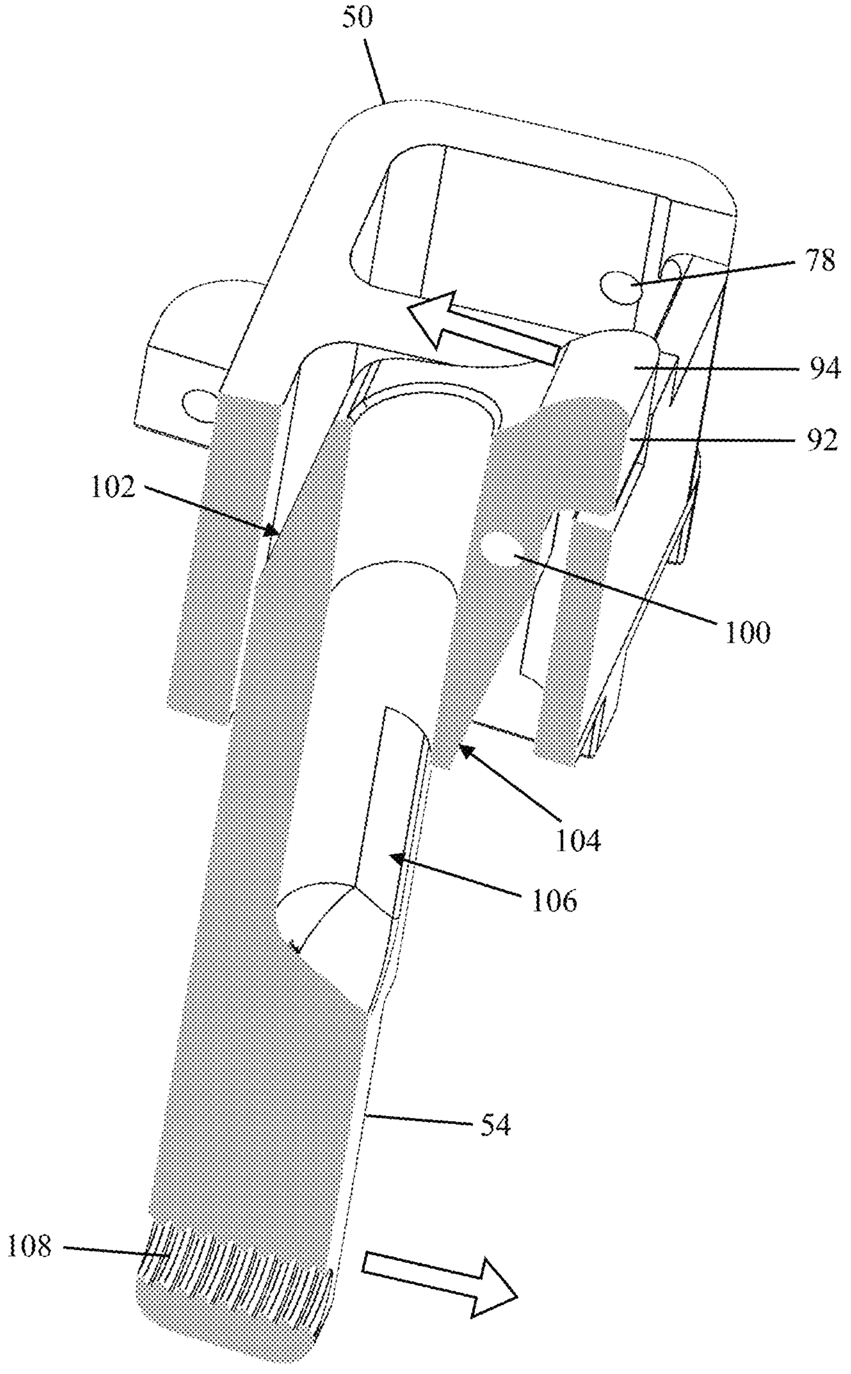
FIG. 21 is a sectional view of the string bending post of FIG. 15 coupled with a housing of FIG. 11, according to some embodiments.

FIGS. 8-10 illustrate an example of the dual-string attenuation assembly 16 forming part of the acoustic stringed instrument pitch changer system 10 according to some embodiments. By way of example only, the dual-string attenuation assembly 16 includes a housing 50, a swing plate 52, a string bending post 54, and a string pin receiver 56. The housing 50 is configured to be positioned within a recess 23 formed in a traditional bridge base 22 mounted to the surface (soundboard) of the acoustic stringed musical instrument 4. The housing 50 includes a first vertical slot 60 dimensioned to receive a string bending post 54 or a string pin receiver 56 (depending upon the string selected for attenuation), a second vertical slot 62 dimensioned to receive the other of a string bending post 54 or a string pin receiver 56 (depending upon the string selected for attenuation), and a pair of arms 64, 66 located at a lower section of the housing 50 dimensioned to rotatably couple the swing plate 52 to the housing 50 such that the swing plate 52 extends into the 162 of the acoustic stringed musical instrument 4 for cooperation with the lever tensioning system 18 (See, e.g., FIGS. 28-30).

While the preferred option may be to use one static saddle section (string pin receiver 56) and the rotating saddle section (string bending post 54) for single-string attenuation, it is contemplated that the dual-string attenuation assembly may be used with two static saddle sections (two string pin receivers 56) or two rotating saddle sections (string bending posts 54). If used with two static saddle sections (two string pin receivers 56), then traditional string pins 21 may be used to secure the strings to the bridge 14 and the guitar can be used as a traditional, non-attenuating instrument. If used with two rotating saddle sections (string bending posts 54), then traditional string pins 21 may be used to secure the strings to the bridge 22 and the guitar can be used as a dual-string attenuating instrument.

Figure 3:
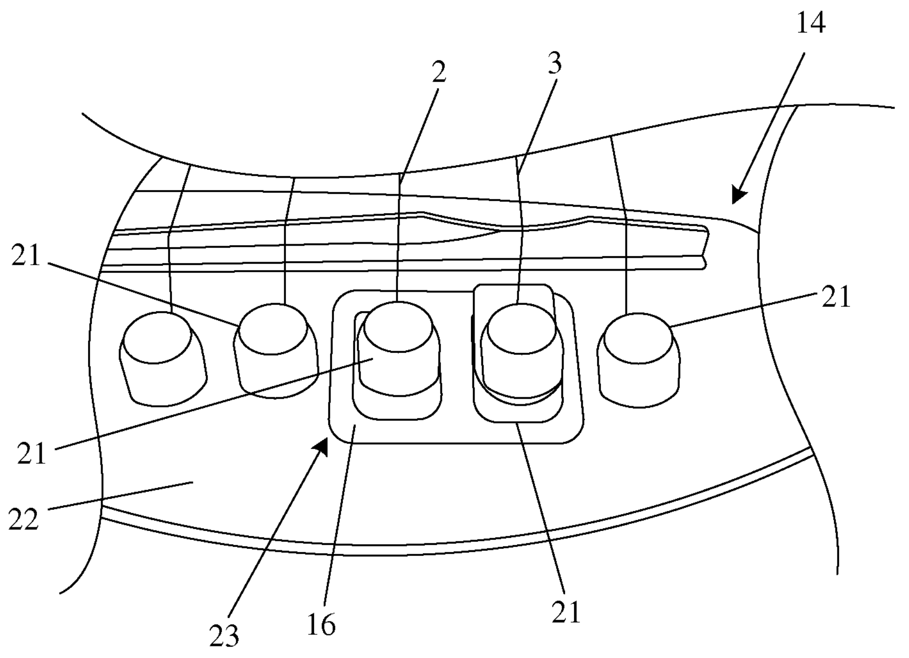
FIGS. 3-5 are various views of an example of a acoustic stringed instrument equipped with a dual-string attenuation assembly mounted within a traditional saddle/bridge assembly, each forming part of the acoustic stringed instrument pitch changer system of FIG. 1, according to some embodiments.
Figure 4:
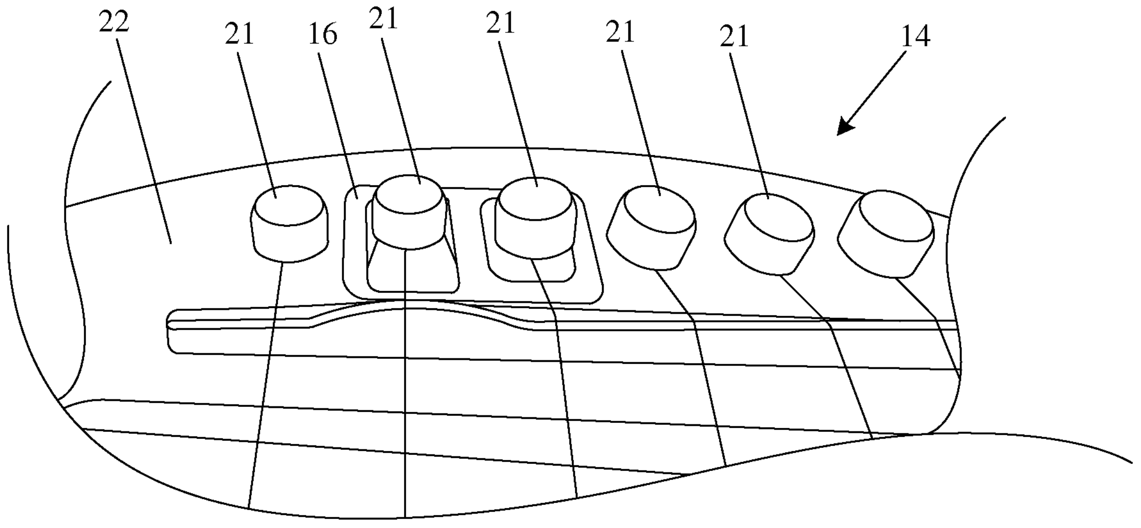
Figure 5:
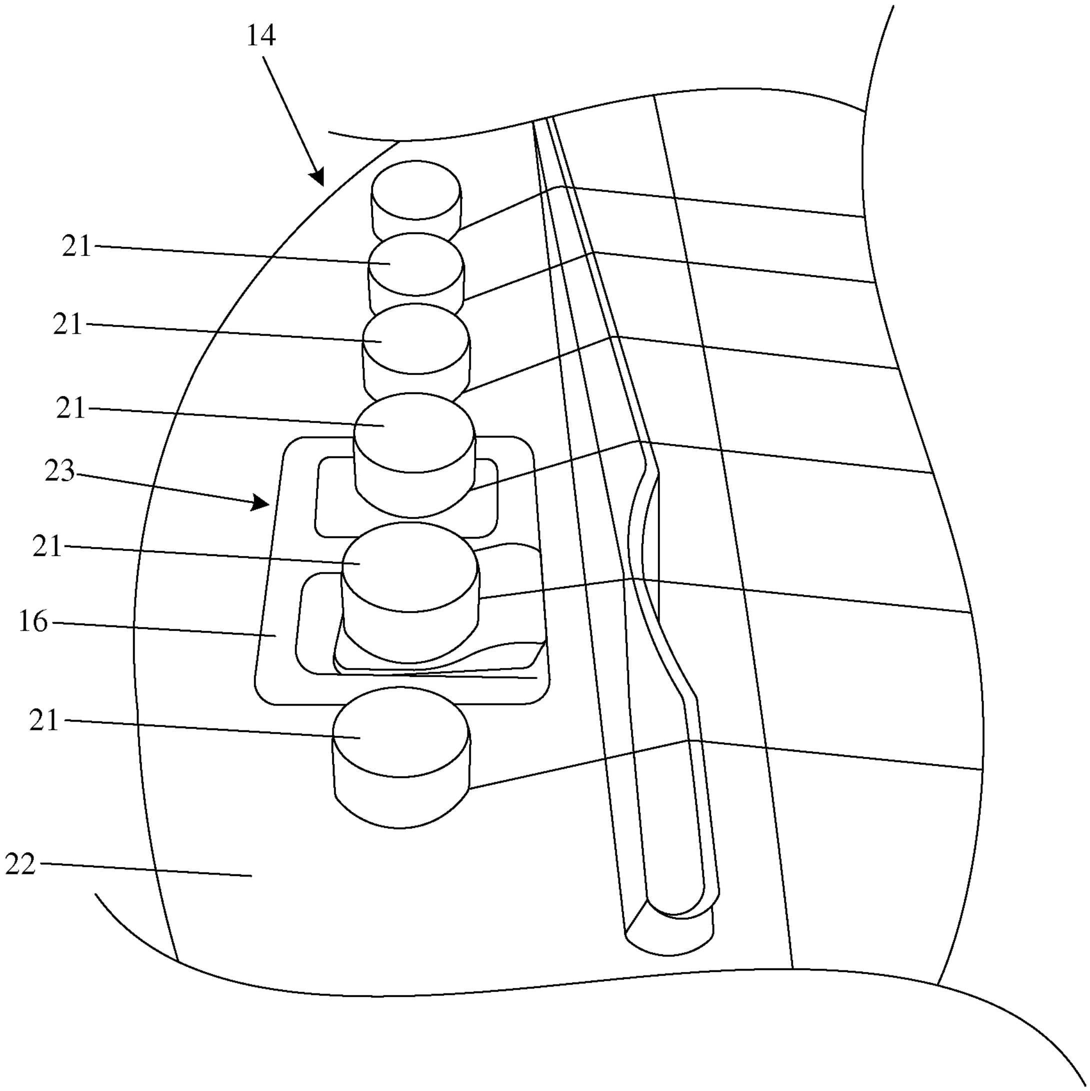
Figure 22:
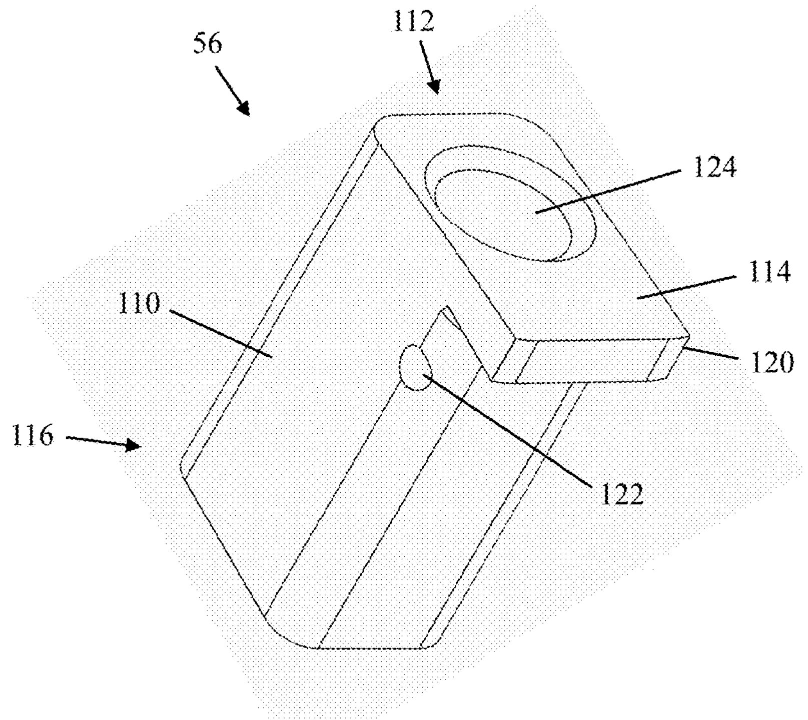
FIGS. 22-24 are top perspective, bottom perspective, and side plan views, respectively, of an example of a string pin receiver forming part of the dual-string attenuation assembly of FIGS. 8-10, according to some embodiments.
Figure 23:
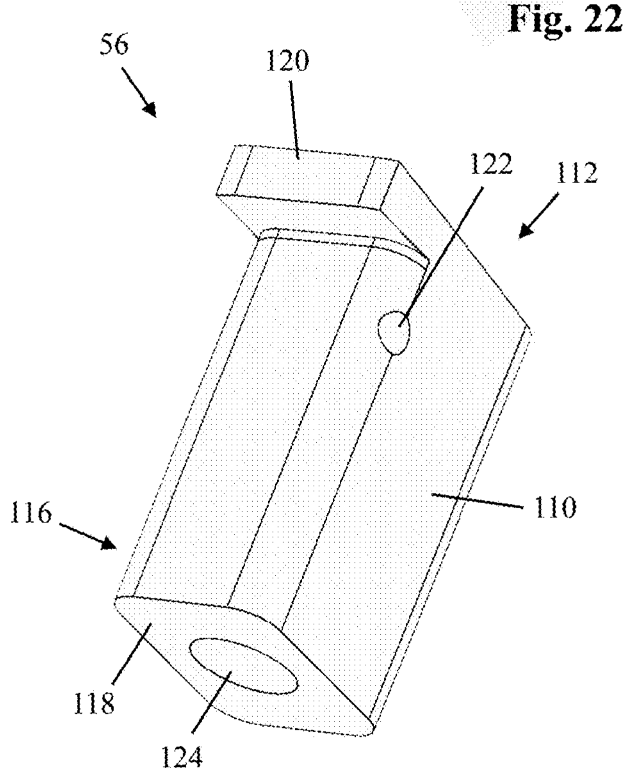
Figure 24:
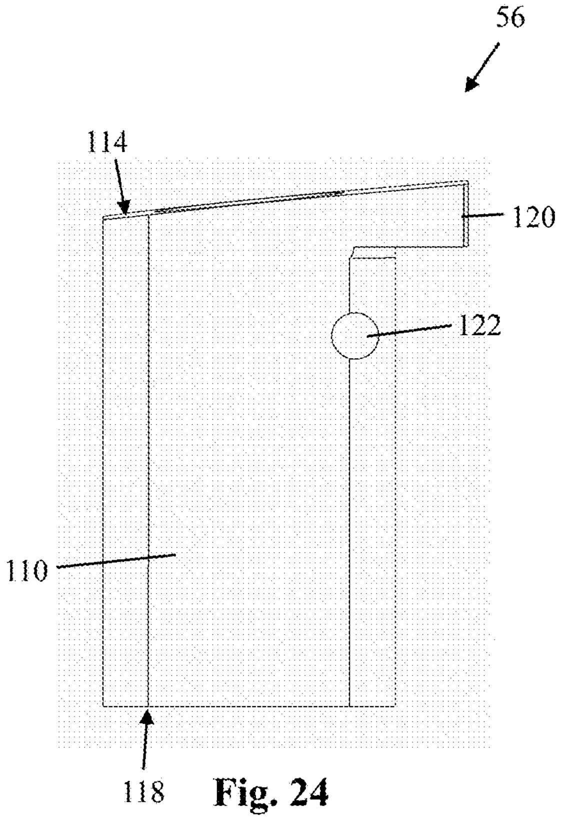
Figure 25:
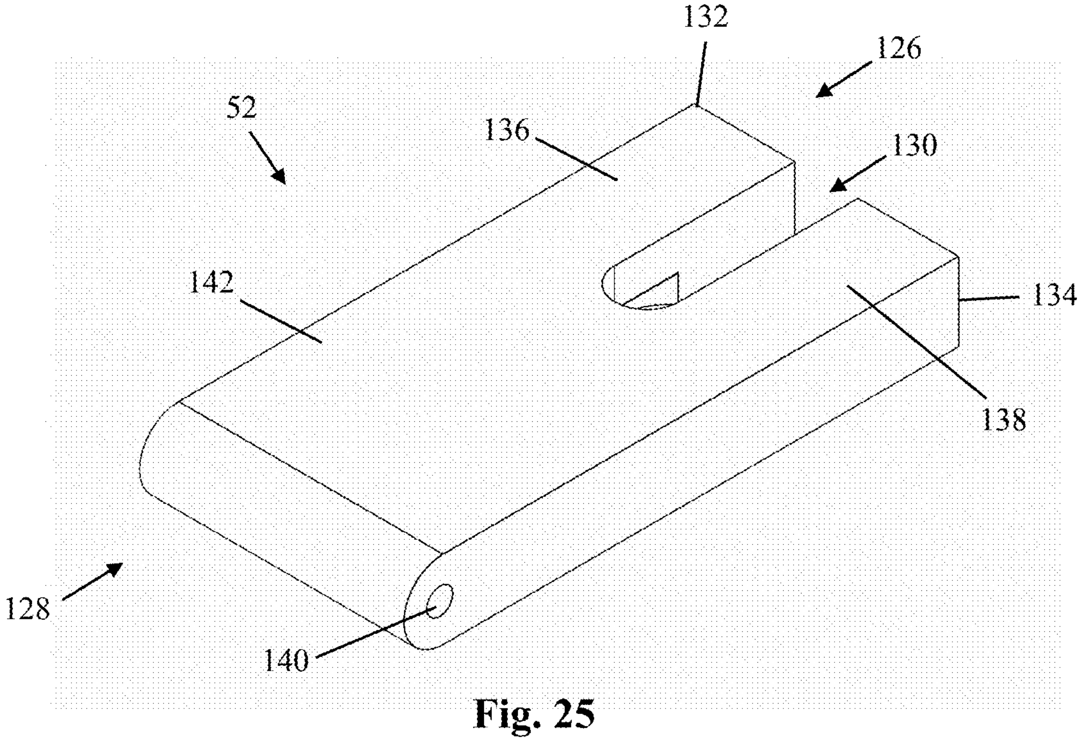
FIGS. 25-26 are perspective and plan views, respectively, of an example of a swing plate forming part of the dual-string attenuation assembly of FIGS. 8-10, according to some embodiments.
Figure 26:
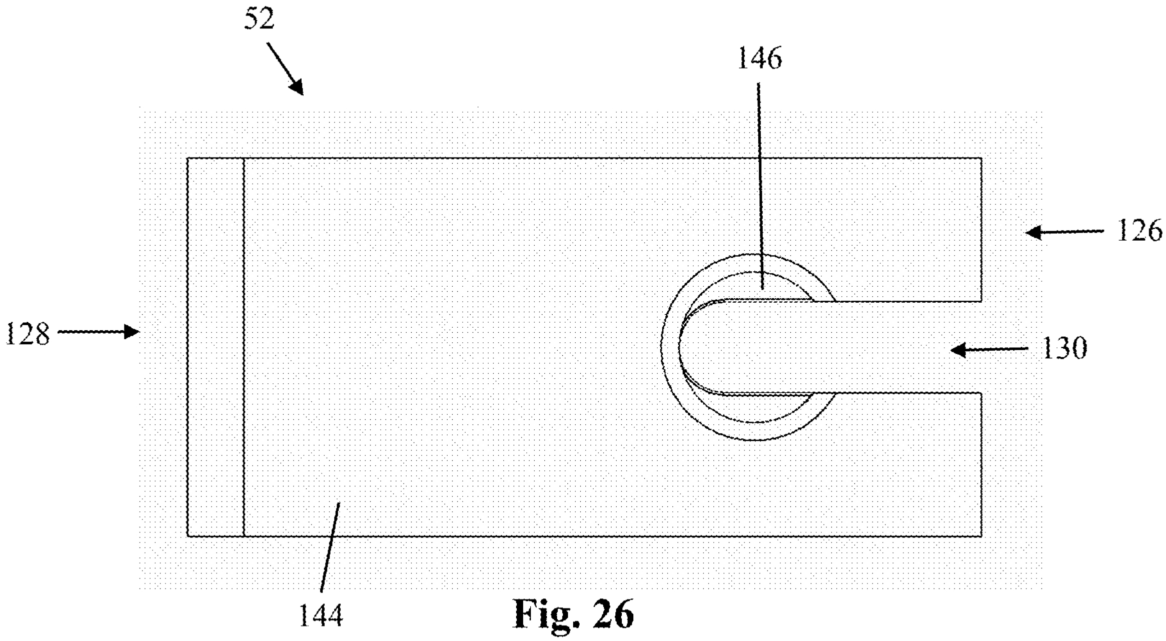
Figure 28:
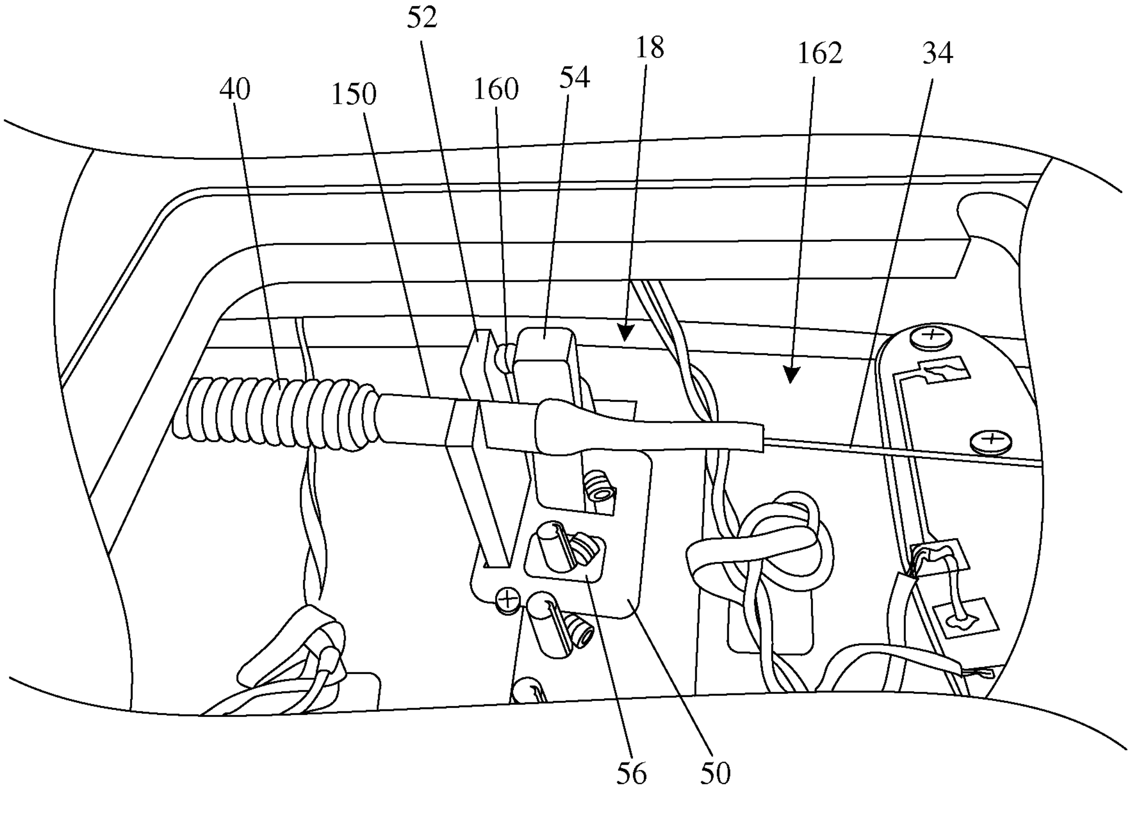
FIGS. 28-30 are various views of an example of the location and interaction between the dual-string attenuation assembly of FIG. 8 and the lever tensioning assembly of FIG. 6, according to some embodiments.
Figure 29:
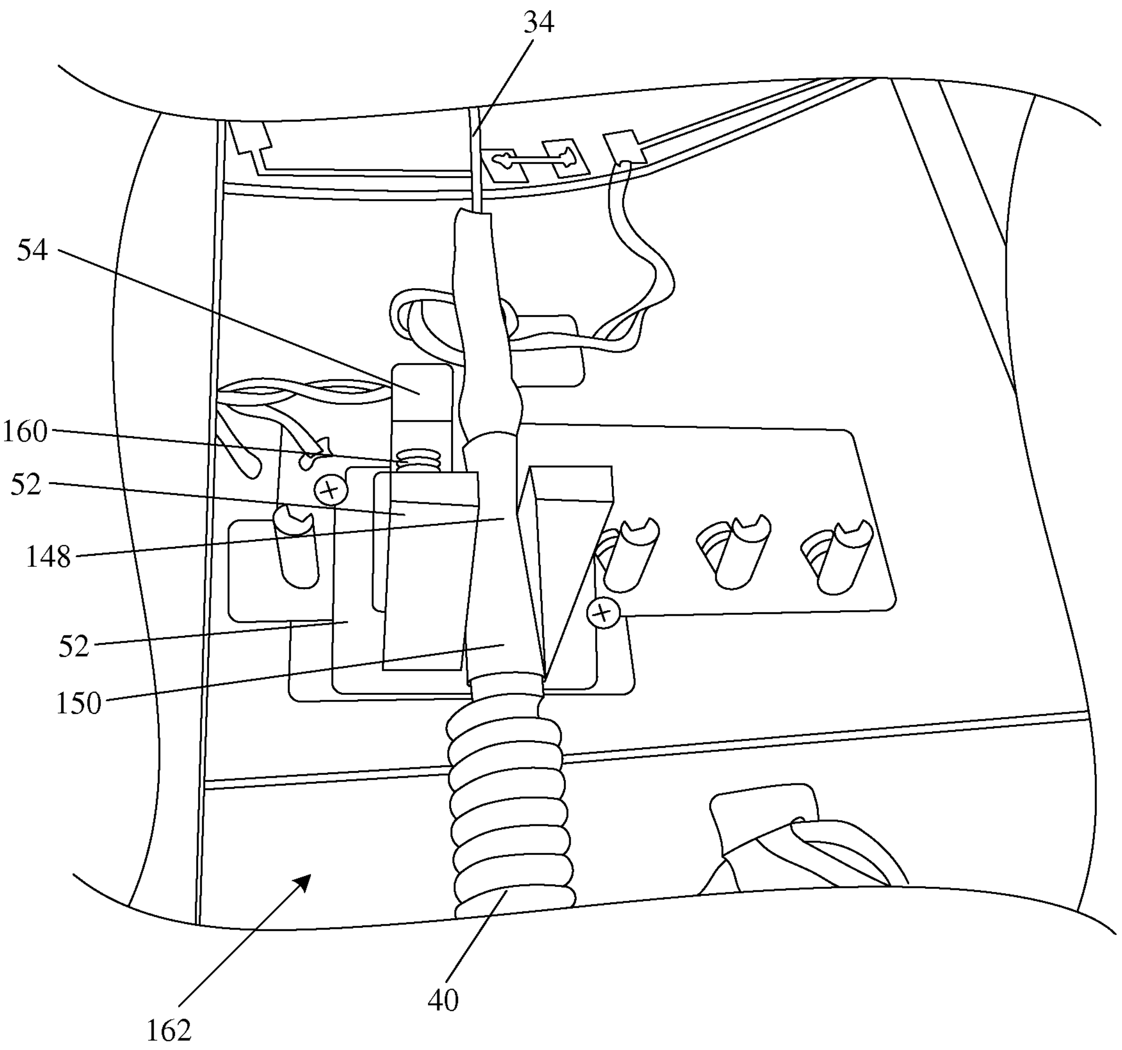
Figure 30:
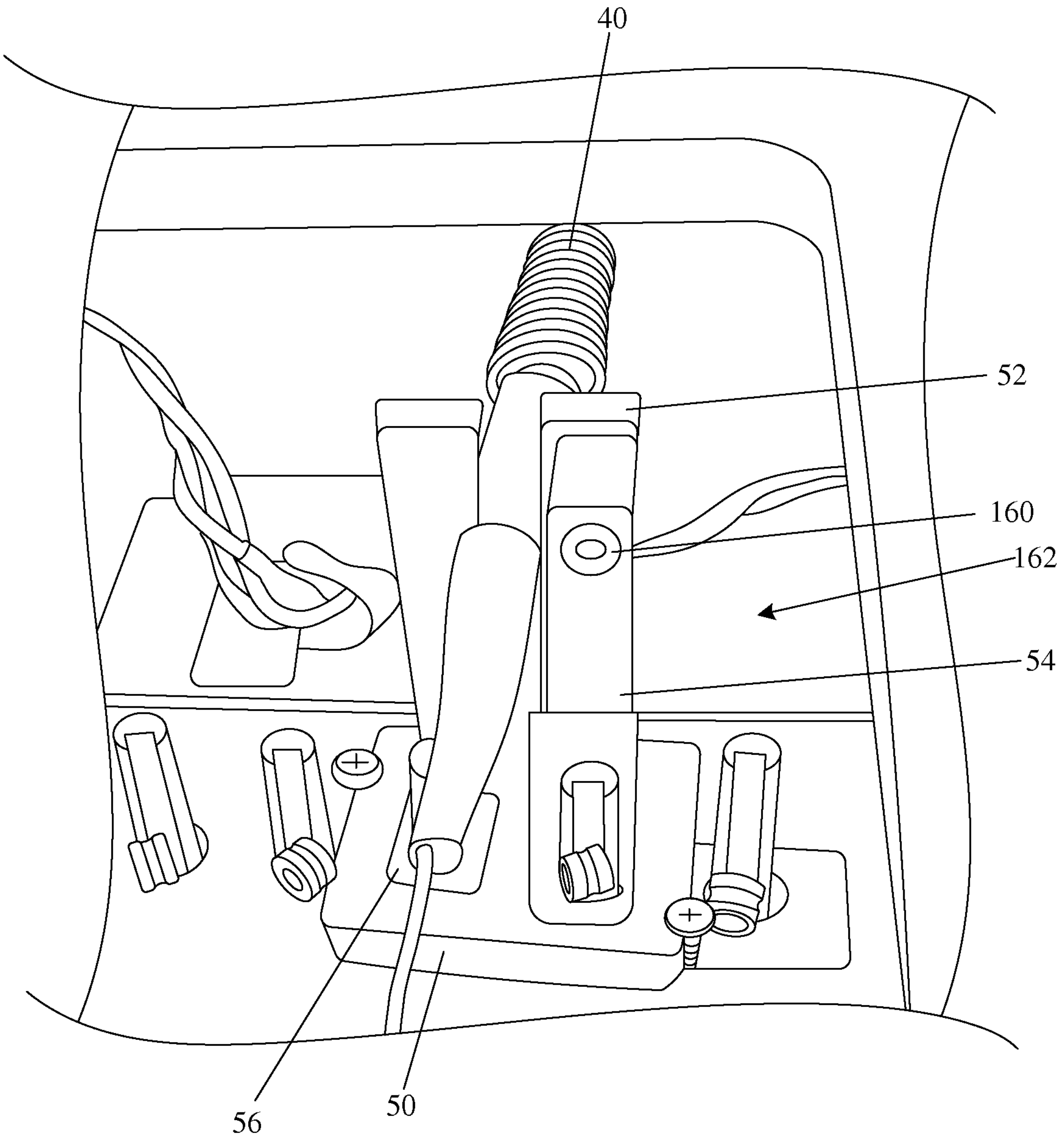

The various features, components and operation of the dual-string attenuation assembly 16 may be best understood with reference to the following sets of drawings. FIGS. 11-14 illustrate the housing 50 forming part of the dual-string attenuation assembly shown in FIGS. 8-10. FIGS. 15-21 illustrate the string bending post 54 forming part of the dual-string attenuation assembly 16 shown in FIGS. 8-10. FIGS. 22-24 illustrate the string pin receiver 56 forming part of the dual-string attenuation assembly 16 shown in FIGS. 8-10. As best seen in FIGS. 3-5, the string pin bending post 54 and the string pin receiver 56 are each dimensioned to receive a traditional string pin 21 for anchoring the associated string to the bridge 14, given that the dual-string attenuation assembly 16 is mounted within the bridge 14. In so doing, the acoustic stringed instrument pitch changer 10 of the present disclosure preserves the traditional ornamental appearance of the bridge assembly (including the bridge 14 and dual-string attenuation assembly 16). FIGS. 25-26 illustrate the swing plate 52 forming part of the dual-string attenuation assembly 16 shown in FIGS. 8-10. Lastly, FIGS. 28-30 illustrate the location and interaction between the dual-string attenuation assembly 16 and the lever tensioning system 18 forming part of the acoustic stringed instrument pitch changing system 10 according to some embodiments.

FIGS. 11-14 illustrate an example of the housing 50 forming part of the dual-string attenuation assembly 16, according to some embodiments. By way of example, the housing 50 may have a generally rectangular body 68 with a top surface 70, a bottom surface 72, a plurality of sidewalls 74, and a central divider 76. The housing 50 further comprises a first vertical slot 60 and second vertical slot 62 positioned within the sidewalls 74 on either side of the central divider 76. The first and second vertical slots 60, 62 are each dimensioned to receive a string bending post 54 or a string pin receiver 56 (depending upon the string selected for attenuation). In some embodiments, the housing 50 further includes a plurality of coupling apertures 78 formed in opposing aspects of the lateral sidewalls 74 and the central divider 76 (e.g., on opposing aspects of the first and second vertical slots 60, 62). By way of example only, the coupling apertures 78 are configured to receive a coupling element (e.g., a cylindrical pin) that extends through a corresponding coupling aperture 100 of the string bending post 54 or a corresponding coupling aperture 122 of the string pin receiver 56 when coaligned to pivotally couple the string bending post 54 or securely couple the string pin receiver 56 to the housing 50.

In some embodiments, the housing 50 further includes a pair of arms 64, 66 located at a lower section of the housing 50 dimensioned to receive the swing plate 52 therebetween. The arms 64, 66 each include opposing coupling apertures 78 configured to receive a coupling element (e.g., a cylindrical pin) that extends through a corresponding coupling aperture 140 of the swing plate 52 when coaligned to rotatably couple the swing plate 52 to the housing 50 such that the swing plate 52 extends into the acoustic chamber 162 (FIGS. 28-30) of the acoustic stringed musical instrument 4 for cooperation with the lever tensioning system 18.

In some embodiments, the housing 50 further includes a pair of top recesses 80 formed in the top surface 70 adjacent to upper aspects of the first and second vertical slots 60, 62. By way of example only, the top recesses 80 are sized and configured to receive at least a portion of the proximal flange 92 of the string bending post 54 or the proximal flange 120 of the string pin receiver 56 (depending on which of the string bending post 54 and the string pin receiver 56 is positioned within the respective vertical slot 60, 62) to provide additional stability to the assembly.

In some embodiments, the bottom surface 72 of the housing 50 may be generally planar. In some embodiments, the top surface 70 of the housing 50 may be curved, for example with a convex curvature to match the generally curved top surface of the bridge/saddle assembly 14 for ergonomics.

FIGS. 15-21 illustrate an example of the string bending post 54 forming part of the dual-string attenuation assembly 16, according to some embodiments. By way of example, the string bending post 54 comprises an elongated body 82 having a proximal (or upper) portion 84, a distal (or lower) portion 86, an anterior side 88 (e.g., that faces toward the neck 8 of the guitar 4 upon assembly) and a posterior side 90 facing in a direction opposite the anterior side 88. The body 82 is sized to pass through the first and/or second vertical slots 60, 62 of the housing, with sufficient clearance to allow a pivoting movement of the string bending post 54 upon activation of the pitch changer system 10. In some embodiments, the proximal portion 84 includes a proximal flange 92 extending proximally therefrom and having a width compatible with the width of the top recess 80 of the housing 50 so that at least a portion of the proximal flange 92 is received within the top recess 80 upon assembly, and a string engaging surface 94 configured to engage a string 3 of the stringed instrument 4. By way of example, the string engaging surface 94 may be a smooth surface having a convex curvature to limit wear of the string 3 during use. In some embodiments, the proximal portion 84 further includes a string aperture 96 formed in a top surface 98 and configured to receive the string 3 and a string pin 21 therein to secure the string 3 to the string bending post 54 (See, e.g., FIGS. 3-5).

In some embodiments, the string bending post 54 has a coupling aperture 100 extending transversely through the elongated body 82 and configured to receive a coupling element (e.g., a cylindrical pin) that extends through the coupling aperture 100 and coupling apertures 78 housing 50 when coaligned to pivotally couple the string bending post 54 to the housing 50 with the first or second vertical slots 60, 62. In some embodiments, the string bending post 54 has a posterior angled surface 102 configured to provide clearance within the vertical slots 60, 62 to enable pivoting of the string bending post 54 therein (See, e.g., FIG. 21), and may also engage with an inner surface of the vertical slot 60 or vertical slot 62 to provide a pivot stop in the posterior direction. In some embodiments, the string bending post 54 has an anterior angled surface 104 configured to provide clearance within the vertical slots 60, 62 to enable pivoting of the string bending post therein, and may also engage with an inner surface of the vertical slot 60 or vertical slot 62 to provide a pivot stop in the anterior direction.

In some embodiments, the elongated body 82 includes an elongated recess 106 formed on the anterior side 88 and configured to create space for the string pin 21. As such, the elongated recess 106 may be continuous with the string aperture 96, as shown by way of example only in FIG. 19.

In some embodiments, the distal portion 86 includes a threaded aperture 108 extending transversely through the elongated body 82. By way of example only, the threaded aperture 108 is configured to receive a bumper element 160 (See FIGS. 28-29) configured to contact the swing plate 52 during use to reduce or eliminate wear due to direct contact between the swing plate 52 and string bending post 54 during use.

FIGS. 22-24 illustrate an example of the string pin receiver 56 forming part of the dual-string attenuation assembly 16, according to some embodiments. By way of example only, the string pin receiver 56 comprises a generally rectangular body 110 configured to snugly fit within the first or second vertical slots 60, 62 such that the string pin receiver 56 does not move within the vertical slots 60, 62 during use. The string pin receiver 56 has a proximal or top end 112 having a top surface 114, and a distal or bottom end 116 having a bottom surface 118. In some embodiments, the string pin receiver 56 has a proximal flange 120 extending laterally from the proximal end 112 and having a width dimension that is complementary to the width dimension of the top recesses 80 in the housing 50 to ensure a stable coupling of the string pin receiver 56 and the housing 50. In some embodiments, the string pin receiver 56 may have a coupling aperture 122 extending transversely through the body 110 and configured to receive a retention pin (not shown) therein that extends through the coupling aperture 122 and engages coupling apertures 78 in the housing 50 when coaligned to help retain the string pin receiver 56 within the vertical slot 60 or 62 during use. The string pin receiver 56 further includes a string aperture 124 formed in the top surface 114 and configured to receive the string 2 and a string pin 21 therein to secure the string 2 to the string pin receiver 56. In some embodiments, the string aperture 124 extends completely through the string pin receiver 56 from the top surface 114 to the bottom surface 118. In some embodiments, the top surface 114 may be curved to seamlessly match the curvature of the bridge/saddle 14.

FIGS. 25-26 illustrate the swing plate 52 forming part of the dual-string attenuation assembly 16, according to some embodiments. By way of example, the swing plate 52 is configured to interact with a string bending post 54 positioned within one of the vertical slots 60, 62 in the housing 50 of the dual-string attenuation assembly 16, along with the lever tensioning system 18, which in turn is coupled to the lever assembly 12. Details on the construction and operation of the swing plate 52 are the same as disclosed in the '291 Patent (incorporated by reference). In some embodiments, the swing plate 52 is generally rectangular in shape and has a first end 126 and a second end 128. By way of example only, the first end 126 includes an elongated gap 130 that defines first and second leg portions 132, 134 on either side of the gap 130, the first and second leg portions 132, 134 having a first contact region 136 and a second contact region 138. The first contact region 136 of the swing plate 52 is configured to contact the string bending post 54 of the dual-string attenuation assembly 16 when the string bending post 54 is positioned through the first vertical slot 60 in the housing 50 of the dual-string attenuation assembly 16. The second contact region 138 of the swing plate 52 is configured to contact the string bending post 54 of the dual-string attenuation assembly 16 when the string bending post 54 is positioned through the second vertical slot 62 in the housing 50 of the dual-string attenuation assembly 16. In some embodiments, the swing plate 52 is hingedly coupled to the housing 50 via a hinge pin (not shown) that passes longitudinally through coupling aperture 140 in the swing plate 52 at the second end 128 and into coupling apertures 79 in the first and second arms 64, 66 of the housing 50 when coaligned.

In some embodiments the elongated gap 130 is dimensioned to engage the upper coupler 42 of the lever tensioning system 18 for the purpose of subjecting the swing plate 52 to the spring tension from the spring 40 during use. More specifically, with reference to FIGS. 6-7, the upper coupler 42 of the lever tensioning assembly 18 includes a tip region 148 extending from a generally cylindrical base region 150. The tip region 148 is generally planar and includes an aperture 152 for coupled engagement with the lower loop 38 of the cable assembly 28. The planar nature of the tip region 148 fits through the elongated gap 130 in swing plate 52 in such a way as to prevent the upper coupler 42 of the spring assembly 18 from rotating when the adjustment screw 48 is turned clockwise or counter-clockwise to tighten or loosen the spring assembly tension on the cable 34 and thus on the lever assembly 12. While shown in FIGS. 6-7 with a smooth exterior, the base region 150 may be configured with threads to engage within the spring 40 for the purpose of coupling the base region 150 to the spring 40. The base region 150 may also have a threaded interior hole that can accept a threaded rod that then engages with another insert 44 in the upper end of the spring 40. The tip region 148 extends in a generally parallel manner through the elongated gap 130 of the swing plate 52 such that the lower loop 38 of the cable assembly 28 is positioned on the front side 142 of the swing plate 52 while the base region 150 is positioned on the back side 144 of the swing plate 52. In some embodiments, the swing plate 52 further includes a cylindrical recess 146 dimensioned to receive at least a portion of the base region 150 of the upper coupler 14 of the lever tensioning assembly 18 to help maintain alignment of the tip region 148 as it passes through the elongated gap 130.

Figure 6:
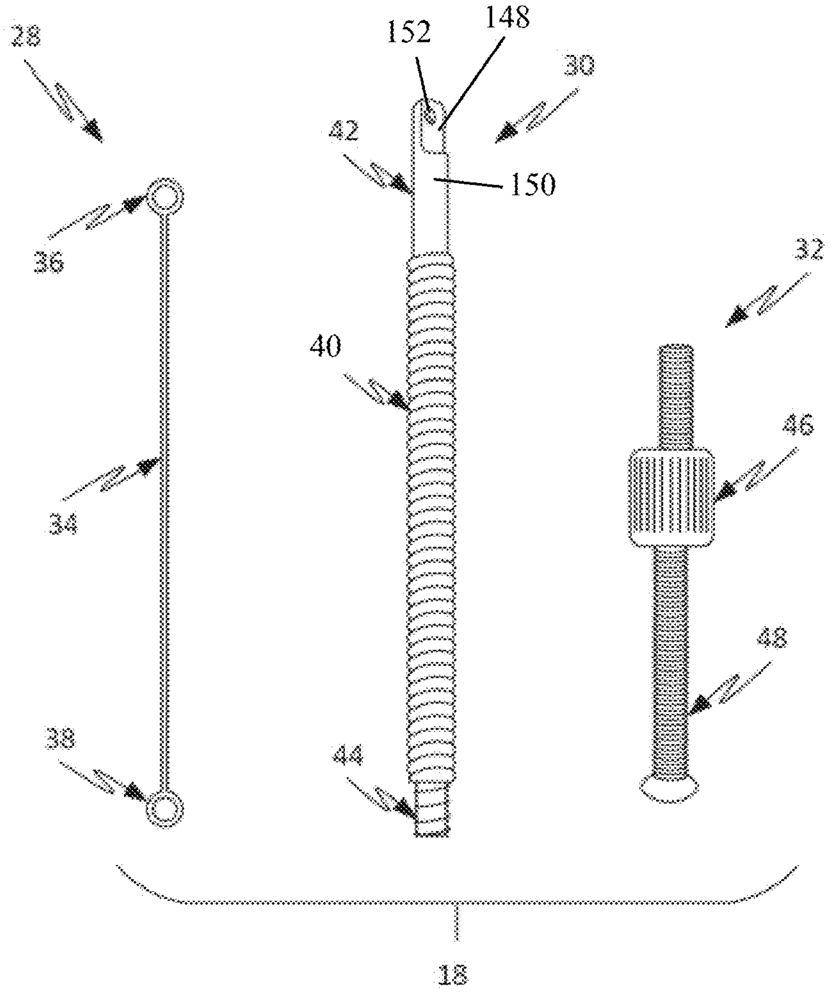
FIG. 6 is a side view of an example of a lever tensioning assembly forming part of the pitch changer system of FIG. 1, according to some embodiments.
Figure 7:
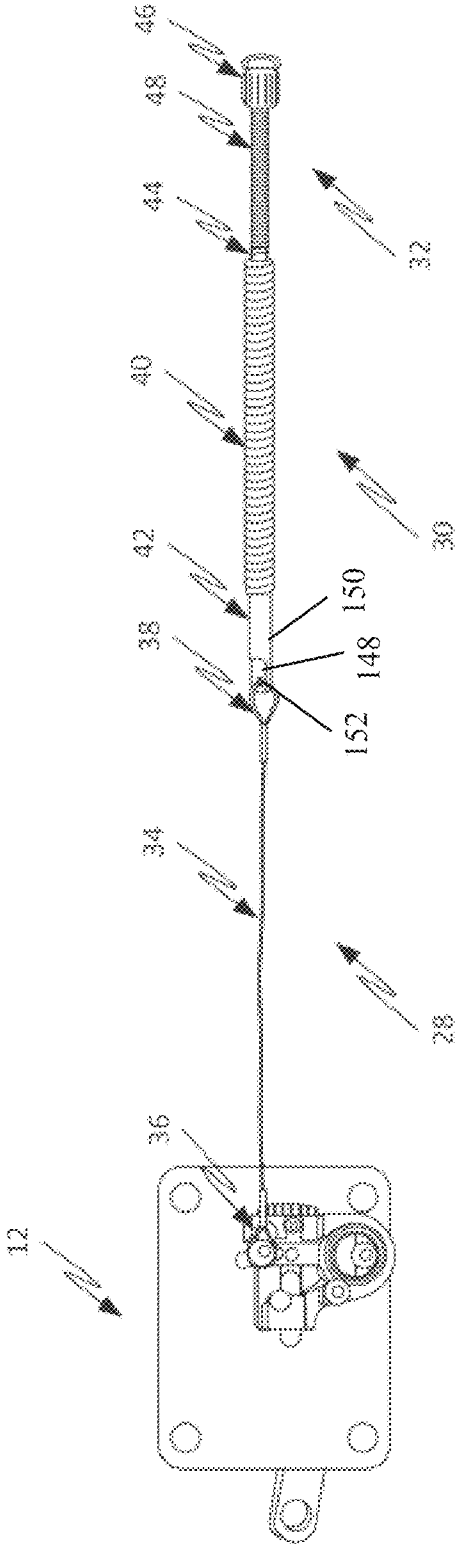
FIG. 7 is a side view of an example of a lever assembly coupled to a lever tensioning assembly of the pitch changer system of FIG. 1, according to some embodiments.

The lever tensioning system 18 is configured to be mounted to the body 6 of the acoustic stringed musical instrument 4. For details on the construction and operation of the lever tensioning system 18, please see the associated disclosure in the '291 Patent (incorporated by reference). As shown in FIG. 6, in some embodiments the lever tensioning system 18 includes a cable assembly 28, a spring assembly 30, and a spring adjustment assembly 32. The cable assembly 28 includes a cable 34 with an upper loop 36 and a lower loop 38. The spring assembly 30 includes a spring 40, an upper coupler 42, and a lower coupler 44. The spring adjustment assembly 32 includes a flanged bushing 46 and an adjustment screw 48. When installed, the upper loop 36 of the cable assembly 28 is coupled to the bell crank (not shown) of the lever assembly 12, the lower loop 38 is coupled to the upper coupler 42 of the spring assembly 30, and the lower coupler 44 has an internal threaded lumen that threadedly receives the adjustment screw 48 such that, upon clockwise rotation, the lower coupler 44 advances towards the bushing 46 to increase the tension exerted by the spring 40 on the lever 22 of the lever assembly 12 (and vice versa via counter-clockwise rotation). FIG. 7 illustrates the lever assembly 12 coupled to the lever tensioning assembly 18 according to some embodiments. In some embodiments, the lever tensioning system 18 includes a spring, a spring tension adjuster, and a coupling system configured to couple the spring to the swing plate 52 and the second section of the bell crank. In use, applying force to move the second section of the lever 20 in a first direction forces the bell crank into rotation such that the coupling system causes the swing plate 52 to force the string bending post 54 of the dual-string attenuation assembly 16 into rotation to elongate and thereby temporarily change the pitch of a string 3 coupled to the string bending post 54. Depending upon whether the string bending post 54 is positioned within the first or second vertical slot 60, 62 of the housing 50, the dual-string attenuation assembly 16 may be used on a first or a second string, such as (by way of example only) the G-string or B-string on an acoustic guitar 4.

The acoustic stringed instrument pitch changer system 10 disclosed herein improves the stability and long-term security of the strap attachment and activation arm through the neck plate by assembling the lever 20 and bell crank of the lever assembly 12 as corresponding half shafts securely combined by two circular bearings or bushings that are mounted in the neck plate assembly, which also serves to optimize the smooth rotation of the lever arm and bell crank assembly. The pitch changer system 10 disclosed herein provides flexibility of choice due to the "dual vertical slot" construction of the dual-string attenuation assembly 16, wherein a string bending post 54 can be positioned in one vertical slot 62 and a traditional string pin receiver 56 can be positioned in the other vertical slot 62, as well as reversed if the adjacent string is selected by the user as the desired string for attenuation. To accomplish this, the string tension is temporarily lowered such that the string bending post 54 and string pin receiver 56 may be reversed within the vertical slots 60, 62 of the housing 50 to allow the activation of the "G" string instead of the "B" string or vice versa. The acoustic stringed instrument pitch changer 10 disclosed herein is also suited, as the name suggests, for acoustic stringed instruments, such as (but not limited to) the Acoustasonic line of guitars from Fender Musical Instruments Corporation of Corona, California.

In some embodiments, the acoustic stringed instrument pitch changer system 10 also significantly reduces the invasive nature of the mechanism on the guitar 4 by combining the mechanism into the structure of the neck plate itself so that the force exerted by the player on the pull lever (and the internal mechanism) is supported by the entirety of the neck plate and its mounting screws. Further, the disclosed acoustic stringed instrument pitch changer system 10 securely mounts the mechanism housing to the neck plate, which allows the lever and mechanism to have improved structural integrity over prior art systems. Additionally, the acoustic stringed instrument pitch changer system 10 disclosed herein includes an entirely self-contained neck plate mechanism, which greatly simplifies and reduces the time required for installation and any service. The disclosed acoustic stringed instrument pitch changer system 10 also boasts a mechanism consisting of a lever axle of two half shafts held together by two bearings, which allows the assembly of the exterior strap activated pull lever arm and the interior bell crank to be installed through and on both sides on the neck plate with a minimum opening in the neck plate. This significantly reduces the chance that dirt or other contaminants can enter the mechanism and increases the structural integrity of the neck mounting plate.

The acoustic stringed instrument pitch changer system 10 disclosed herein may include a variety of additional features and/or design modifications. For example, in addition to pitch changing via strap-enabled lever actuation (to string bend when the player pushes the guitar down or away from his/her body), it is also contemplated that a cable or other element may be employed to allow the player to note-bend by pulling up on the guitar (vs. pushing down on the guitar as described above). The pitch-changing may be tunable or adjustable via the use of a stop that limits the travel of the lever arm to achieve a predetermined, preferred pitch change. Such a tuner is commonly an adjustable stop that limits the travel of the bell crank (coupled to the lever arm via rod and/or cable to another lever) and the string anchoring finger (mounted within the instrument bridge to which the instrument string is also anchored). The rotation of this string anchoring finger stretches and/or releases said string by an adjustable increment which causes the desired pitch bend. Commonly, a spring or other resistive means is also connected to the bottom of the string finger and may extend further through the instrument body to an accessible screw seated in a bushing, ferrule or on a plate where the resistive tension can be adjusted.

The lever 20 of the lever assembly 12 is securely and rigidly connected to the axis on which it rotates. It securely shares this axis with the bell crank, which advantageously pulls the linkage connecting to the bridge saddle to affect the string length and note pitch. By way of example, the pitch changer 10 accomplishes this by constructing the strap lever arm and the bell crank each as unitary pieces machined with, welded to or otherwise permanently connected to opposite halves of the axis shaft that extends through the mounting plate. In use, these two halves of the axis shaft are assembled and held rigidly as one axis shaft by an upper and lower bearing or low friction bushing. These bearings/or bushings are firmly seated in a bearing block chassis that is constructed as a unitary fabrication of the mounting plate or, alternatively, this chassis is screwed, soldered, glued or welded to said neck plate. This bearing block and cover plate can also contain the adjustable tuner stop against which the bell crank will stop its rotation and that of the strap lever. Because the two axis shaft halves are banded together by bearings or bushings, and the bearings or bushings are firmly seated in the chassis, the strap lever and bell crank can be assembled through a cover plate with an opening minimally larger than the axis shaft. Further, because the strap lever arm and bell crank are held together by one or more bearings or bushings and said bearings or bushings are rigidly retained in the bearing block, this assembly will then act as one unitary piece and will not be subject to loosening when subject to the stresses of constant use, impact or vibration. Further, the main lever arm is connected to the axis and bell crank without the use of any screw or bolt subject to coming loose or having its threads or head stripping through repeated tightening. This assembly of strap lever, axis shaft, bell crank, bearings, chassis, tuner stop and cover plate is thus an integrated unit that can be dropped whole into a cavity in the instrument body for installation simplicity, economic advantage and durability.

The acoustic stringed instrument pitch changer system 10 disclosed herein enables the ability to quickly and easily switch between strings for pitch bending. For example, musicians who employ this mechanism and its mechanically enabled pitch bending style commonly select the "B" string or "G" string or both for pitch bending. Typically, musicians use one string or the other and less frequently both. Heretofore, it has been complicated or impossible for the player to select which string to apply strap activated string bending. With the acoustic stringed instrument pitch changer of the present disclosure, a player may simply and quickly loosen the strings and reverse the location of the string pin receiver and string bending post (from the first vertical slot to the second vertical slot of the housing or vice versa) and thus convert a "B" mechanism into a "G" mechanism or vice versa. The string length tuning compensation or intonation offset is also designed to similarly reverse itself to accommodate the difference of string length between a "E" and "B" string saddle and a "G" and "D" string saddle as adjusted for typical acoustic guitar string sets.

While the preferred option may be to use one static saddle section (string pin receiver 56) and the rotating saddle section (string bending post 54) for single-string attenuation, it is contemplated that the dual-string attenuation assembly 16 may be used with two static saddle sections (two string pin receivers 56) or two rotating saddle sections (string bending posts 54). If used with two static saddle sections (two string pin receivers 56), then traditional string pins 21 may be used to secure the strings to the bridge 14 and the guitar 4 can be used as a traditional, non-attenuating instrument. If used with two rotating saddle sections (string bending posts 54), then traditional string pins 21 may be used to secure the strings to the bridge 14 and the guitar 4 can be used as a dual-string attenuating instrument. In a further embodiment of the dual-string attenuation, each string may be attenuated at the same time or staggered in time.

The dual-string attenuation assembly 16 of the acoustic stringed instrument pitch changing system 10 is dimensioned to be positioned within a recess formed through a traditional bridge 22 located on the soundboard of an acoustic stringed instrument 4, as well as the underlying section of the soundboard itself. The string bending post 54 and the string pin receiver 56 thusly extend into the acoustic chamber 162 of the acoustic stringed instrument 4, such that the string bending post 54 interacts with the swing plate 52, which rotates from the lower section of the housing 50 of the dual-string attenuation assembly 16. This swing plate 52 allows quick and simple alternating of position of the selected string mechanism and, in addition, may be articulated to permit the "G" string bending post (if selected) to contact the swing plate with an offset comparable to the longer string length intonation offset of a typical "G" string saddle. Same for the B-string.

The acoustic stringed instrument pitch changer 10 of the present disclosure also boasts a number of features and advantages. The lever assembly 12 has a unitary pre-assembled drop-in design to quickly and easily be installed on the neck 8 of the guitar 4 by substituting it for the factory neck plate. The lever assembly 12 includes a bearing housing extending from the lower surface of the mounting plate which houses a pair of bearing assemblies (upper and lower) which hold together the two halves of the split crank shaft (half-shaft of lever mating with half-shaft of the bell crank) to allow the lever arm and the bell crank to be assembled through an essentially shaft sized hole in the mounting plate while acting as one strong unitary piece not subject to loosening. The bell crank includes an arm extending from the half-shaft, which includes multiple attachment points for coupling with a cable forming part of the lever tensioning system (e.g. spring, spring tension adjuster, and cable) to provide multiple rotational ranges of the lever (e.g. three attachment points for low, medium, and large rotational ranges of the lever). The tuner thumbscrew and bell crank stop are self-contained.

By virtue of the dual-string attenuation assembly 16, which mounts within a traditional acoustic bridge 22, the overall bridge of an acoustic stringed instrument 4 with the acoustic string instrument pitch changer system 10 disclosed herein includes a static saddle section and a rotating saddle section. In one exemplary embodiment, the static saddle section may include the E, A, D and E strings, as well as the string associated with the string pin receiver 56 of the dual-string attenuation assembly 16, namely the G or B string, by way of example only. The rotating saddle section includes the string associated with the string bending post 54, either the G or B, by way of example only. The rotating saddle section may be reversed and placed in the other of the two vertical slots 60, 62 of the housing 50 of the dual-string attenuation assembly 16, as desired.

In use, the guitar 4 will be equipped with a guitar strap (not shown) having a first end coupled to a first strap button 50 on the end of the body 6, a second end coupled to the end of the lever 20 of the lever assembly 12, and a strap section extending therebetween positioned diagonally over the back and left shoulder of the player for the right-handed guitar 4 shown in FIGS. 1-2 (reverse for left-handed guitars). Collectively, the components of the pitch changer system 10 allow a player of the guitar 4 to change the pitch of a selected string by moving the guitar 4 (e.g. tipping the neck 8 downward while playing) such that the guitar strap will force the lever 22 into clockwise rotation. This rotational force increases the length of the selected string during such lever rotation to effectuate a desired pitch change. When the rotational force is removed (e.g. the neck 8 is tipped back up while playing), the lever 22 rotates counter-clockwise under spring tension of the lever tensioning system 18 to return to a starting position, during which rotation the string length decreases to bring the selected string back to its index or normal pitch. By way of example only, the selected string may be the G string and the pitch changer system 10 may be employed to temporarily change the pitch to G #, A or A # or to another desired increment. As will be described below, the pitch changer system 10 may also be used with any number of other guitar strings, including but not limited to the B string in order to temporarily change the pitch to C, C# or D or to another desired increment. Moreover, although described above in use with a guitar strap, it will be appreciated that the pitch changer system 10 may actuated with any strap, cord, band or other means anchored or wrapped about the player's shoulder, waist, foot or other stationary part that may be used to exert resistive force.

Figure 27:
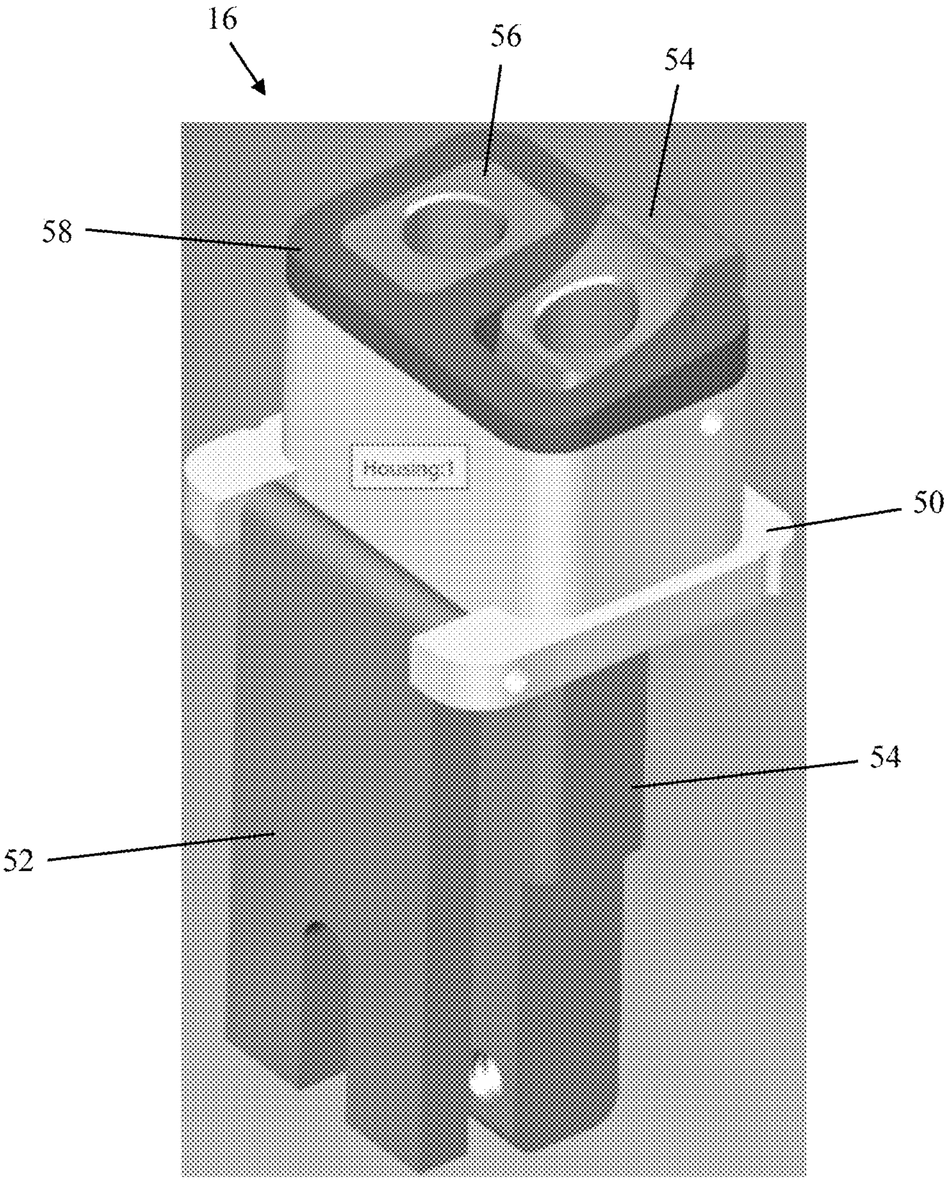
FIG. 27 is a perspective view of another example of a dual-string attenuation assembly forming part of the acoustic stringed instrument pitch changer system of FIG. 1, according to some embodiments.

FIG. 27 illustrates a dual-string attenuation assembly 16 forming part of the acoustic stringed instrument pitch changer system 10 according to some embodiments. The dual-string attenuation assembly 16 of the current embodiment includes a housing 50, a swing plate 52, a string bending post 54, a string pin receiver 56, and a top 58. By way of example, the housing 50, swing plate 52, string bending post 54, and string pin receiver 56 are fundamentally similar to the corresponding elements described above. In some embodiments, the top 58 is configured for placement on top of the housing. In some embodiments, the top 58 is made out of wood to match the wooden material of the bridge 22.

Any of the features or attributes of the above-described embodiments and variations can be used in combination with any of the other features and attributes of the above-described embodiments and variations as desired. For example, the dual-string attenuation assembly 16 may be used with two string pin receivers 56 such that the acoustic stringed instrument 4 can be used as a conventional guitar, but upgraded or modified to add the string bending post 54 as desired to transform the guitar 4 into a string attenuation version or vice versa. Moreover, if desired one or more stamped rings (having the same or similar footprint as the top sections 58 of the dual-string attenuation assembly 16) may added underneath the top section 58 to provide height adjustment. In a still further aspect, the string bending post 54 may have a raised front lip contoured to cause the string to stretch along a radius rather than fold back and forth at a point that might cause fatigue fracture over time.

From the foregoing disclosure and detailed description of certain preferred embodiments, it is also apparent that various modifications, additions and other alternative embodiments are possible without departing from the true scope and spirit. The embodiments discussed were chosen and described to provide the best illustration of the principles of the present disclosure and its practical application to thereby enable one of ordinary skill in the art to utilize the disclosure in various embodiments and with various modifications as are suited to the particular use contemplated. All such modifications and variations are within the scope of the present disclosure as determined by the appended claims when interpreted in accordance with the benefit to which they are fairly, legally, and equitably entitled.

What is claimed is:

1. A pitch changer system for a stringed musical instrument having a body, a neck, and a saddle assembly attached to the body, the pitch changer system comprising:

- a lever assembly configured to be mounted to said body of said stringed musical instrument, said lever assembly including a lever rotatably coupled to a mounting plate;
- a dual-string attenuation assembly configured to be mounted to said saddle assembly, said dual-string attenuation assembly including:
  - a housing coupled to said saddle assembly and including a first vertical slot and a second vertical slot extending through said housing;
  - a rotating string bending post positioned within said first vertical slot and hingedly coupled to said housing, said rotating string bending post including a string aperture configured to receive a first string of said instrument and a string pin to secure said first string to said rotating string bending post during use; and
  - a static string pin receiver positioned within said second vertical slot, said static string pin receiver including a string aperture configured to receive a second string of said instrument and a string pin to secure said second string to said static string pin receiver during use; and
- a lever tensioning system configured to be mounted to said body of said stringed musical instrument, wherein applying force to move said lever in a first direction forces said rotating string bending post into rotation to elongate and thereby temporarily change the pitch of said first string.

2. The pitch changer system of claim 1, wherein said rotating string bending post and said static string pin receiver may be selectively reversed relative to said first and second vertical slots of said housing such that said second string of said instrument is associated with said rotating bending post and said first string of said instrument is associated with said static pin receiver.

3. The pitch changer system of claim 1, further comprising a swing plate hingedly coupled with said housing and configured to extend into an acoustic chamber formed in the body of the stringed musical instrument, said swing plate including a recess configured to receive a portion of the lever tensioning system therein.

4. The pitch changer system of claim 3, wherein the swing plate is configured to transfer the force applied to the lever through the lever tensioning system to the rotating string bending post to cause the rotating string bending post to rotate within the first vertical slot of the housing.

5. The pitch changer system of claim 4, wherein the rotating string bending post further comprises a bumper element coupled to a distal end of the rotating string bending post and configured to interface with the swing plate.

6. The pitch changer system of claim 3, wherein the swing plate includes a first contact region on a first side of the recess, and a second contact region on the second side of the recess.

7. The pitch changer system of claim 6, wherein the first contact region is aligned with the first vertical slot of the housing, and the second contact region is aligned with the second vertical slot of the housing.

8. The pitch changer system of claim 1, wherein the rotating string bending post includes a proximal flange extending beyond a top surface of the housing, the proximal flange having a curved string engaging surface configured to interface with the first string of the stringed musical instrument.

9. The pitch changer system of claim 1, wherein the housing includes a top surface and a bottom surface, and the top surface has a curvature corresponding to a curvature of the saddle assembly to seamlessly integrate the housing into the saddle assembly.

10. The pitch changer system of claim 1, wherein the static string pin receiver comprises a top surface and a bottom surface, and the top surface has a curvature corresponding to a curvature of the saddle assembly to seamlessly integrate into the housing and the saddle assembly.

11. The pitch changer system of claim 10, wherein the static string pin receiver further comprises a proximal flange including a lateral extension of the top surface, the proximal flange dimensioned to be received within a top recess of the housing, the top recess positioned adjacent the second vertical slot.

12. The pitch changer system of claim 1, wherein the stringed musical instrument is an acoustic guitar.

13. A method of equipping a stringed musical instrument having a body and a neck with a pitch changer system, comprising the steps of:

- creating a lever assembly bore in the body of the stringed musical instrument dimensioned to receive a lever assembly;
- creating a lever tensioning system bore in the body of the stringed musical instrument dimensioned to receive a lever tensioning system;
- installing said lever assembly within said lever assembly bore, said lever tensioning system within said lever tensioning system bore, and a dual-string attenuation assembly to a saddle assembly; and
- interconnecting said pitch changer system such that, during use, an application of force to said lever temporarily changes the pitch of a string coupled to the dual-string attenuation assembly.

14. The method of claim 13, wherein said lever assembly comprises a lever rotatably coupled to a mounting plate.

15. The method of claim 13, wherein said dual-string attenuation assembly comprises:

- a housing coupled to said saddle assembly and including a first vertical slot and a second vertical slot extending through said housing;
- a rotating string bending post positioned within said first vertical slot and hingedly coupled to said housing, said rotating string bending post including a string aperture configured to receive a first string of said instrument and a string pin to secure said first string to said rotating string bending post during use; and
- a static string pin receiver positioned within said second vertical slot, said static string pin receiver including a string aperture configured to receive a second string of said instrument and a string pin to secure said second string to said static string pin receiver during use.

16. The method of claim 15, wherein said dual-string attenuation assembly further comprises a swing plate hingedly coupled with said housing and configured to extend into an acoustic chamber formed in the body of the stringed musical instrument, said swing plate including a recess configured to receive a portion of the lever tensioning system therein.

17. The method of claim 16, wherein the swing plate transfers the force applied to the lever through the lever tensioning system to the rotating string bending post to cause the rotating string bending post to rotate within the first vertical slot of the housing.

18. The method of claim 17, wherein the rotating string bending post further comprises a bumper element coupled to a distal end of the rotating string bending post and configured to interface with the swing plate.

19. The method of claim 15, further comprising selectively reversing the rotating string bending post and said static string pin receiver relative to said first and second vertical slots of said housing such that said second string of said instrument is associated with said rotating bending post and said first string of said instrument is associated with said static pin receiver.

20. The method of claim 13, wherein the stringed musical instrument is an acoustic guitar.

* * * * *